United States Patent
de Oliveira Antunes et al.

(10) Patent No.: US 10,625,456 B2
(45) Date of Patent: *Apr. 21, 2020

(54) INJECTION MOLDING FLOW CONTROL APPARATUS AND METHOD

(71) Applicant: Synventive Molding Solutions, Inc., Peabody, MA (US)

(72) Inventors: Sergio Ribeiro de Oliveira Antunes, Amesbury, MA (US); Lin Yang, Lynnfield, MA (US); Vito Galati, Rowley, MA (US); Hans-Joerg Schreyer, Mommenheim (DE)

(73) Assignee: Synventive Molding Solutions, Inc., Peabody, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/054,386

(22) Filed: Aug. 3, 2018

(65) Prior Publication Data
US 2018/0339443 A1 Nov. 29, 2018

Related U.S. Application Data

(60) Continuation of application No. 15/432,175, filed on Feb. 14, 2017, now Pat. No. 10,307,951, which is a
(Continued)

(51) Int. Cl.
*B29C 45/28* (2006.01)
*B29C 45/76* (2006.01)
(Continued)

(52) U.S. Cl.
CPC .......... *B29C 45/7613* (2013.01); *B29C 45/03* (2013.01); *B29C 45/2703* (2013.01);
(Continued)

(58) Field of Classification Search
CPC .............. B29C 45/281; B29C 45/2865; B29C 45/2872
See application file for complete search history.

(56) References Cited

U.S. PATENT DOCUMENTS

| 5,078,589 A | 1/1992 | Osuna-Diaz |
| 5,556,582 A | 9/1996 | Kazmer |

(Continued)

FOREIGN PATENT DOCUMENTS

| EP | 0153554 A2 | 4/1985 |
| EP | 0967063 A1 | 12/1999 |
| WO | 2001/021377 A1 | 3/2001 |

OTHER PUBLICATIONS

European Search Report dated May 15, 2017 in corresponding European Application No. 17154560.1.

*Primary Examiner* — James Sanders
(74) *Attorney, Agent, or Firm* — Polsinelli, PC

(57) ABSTRACT

Injection molding apparatuses and methods wherein a valve pin is controllably driven upstream and downstream along an axis between a first closed position where the tip end of the valve pin obstructs the gate to prevent the injection fluid from flowing into the cavity, a full open position and one or more intermediate positions,
wherein the valve pin is drivable to be disposed or held in a selected intermediate position for a selected period of time during the course of an injection cycle where the tip end of the valve pin restricts flow of injection fluid through the gate to the mold cavity.

12 Claims, 17 Drawing Sheets

Related U.S. Application Data continuation of application No. 14/930,692, filed on Nov. 3, 2015, now Pat. No. 9,908,273, which is a continuation of application No. 13/569,464, filed on Aug. 8, 2012, now Pat. No. 9,205,587, said application No. 15/432,175 is a continuation-in-part of application No. 15/291,721, filed on Oct. 12, 2016, now Pat. No. 9,878,477, which is a continuation of application No. 14/311,785, filed on Jun. 23, 2014, now Pat. No. 9,498,909, which is a continuation-in-part of application No. 13/484,336, filed on May 31, 2012, now Pat. No. 9,011,736, which is a continuation of application No. PCT/US2011/062099, filed on Nov. 23, 2011, said application No. 15/432,175 is a continuation-in-part of application No. 15/286,917, filed on Oct. 6, 2016, now Pat. No. 9,937,648, which is a continuation of application No. 14/325,443, filed on Jul. 8, 2014, now Pat. No. 9,492,960, said application No. 15/432,175 is a continuation-in-part of application No. 14/567,308, filed on Dec. 11, 2014, now Pat. No. 9,623,598, which is a division of application No. 13/484,336, filed on May 31, 2012, now Pat. No. 9,011,736, which is a continuation of application No. PCT/US2011/062099, filed on Nov. 23, 2011, said application No. 14/432,175 is a continuation-in-part of application No. 14/567,369, filed on Dec. 11, 2014, now Pat. No. 9,636,858, which is a division of application No. 13/484,408, filed on May 31, 2012, now Pat. No. 9,005,509, which is a continuation of application No. PCT/US2011/062096, filed on Apr. 14, 2011.

(60) Provisional application No. 61/475,340, filed on Apr. 14, 2011, provisional application No. 61/416,583, filed on Nov. 23, 2010.

(51) Int. Cl.
*B29C 45/27* (2006.01)
*B29C 45/77* (2006.01)
*B29C 45/80* (2006.01)
*B29C 45/03* (2006.01)
*G05B 15/02* (2006.01)
*G05D 7/06* (2006.01)
*B29C 45/17* (2006.01)
*B29K 105/00* (2006.01)

(52) U.S. Cl.
CPC ...... *B29C 45/2708* (2013.01); *B29C 45/2806* (2013.01); *B29C 45/76* (2013.01); *B29C 45/77* (2013.01); *B29C 45/80* (2013.01); *G05B 15/02* (2013.01); *G05D 7/0635* (2013.01); *B29C 45/281* (2013.01); *B29C 2045/1792* (2013.01); *B29C 2045/2712* (2013.01); *B29C 2045/2824* (2013.01); *B29C 2045/2865* (2013.01); *B29C 2045/2872* (2013.01); *B29C 2945/76006* (2013.01); *B29C 2945/7628* (2013.01); *B29C 2945/76076* (2013.01); *B29C 2945/76083* (2013.01); *B29C 2945/76277* (2013.01); *B29C 2945/76381* (2013.01); *B29C 2945/76545* (2013.01); *B29C 2945/76568* (2013.01); *B29C 2945/76598* (2013.01); *B29C 2945/76755* (2013.01); *B29C 2945/76859* (2013.01); *B29C 2945/76933* (2013.01); *B29C 2945/76936* (2013.01); *B29C 2945/76939* (2013.01); *B29C 2945/76993* (2013.01); *B29K 2105/0067* (2013.01)

(56) References Cited

U.S. PATENT DOCUMENTS

| | | |
|---|---|---|
| 6,145,022 A | 11/2000 | Takizawa |
| 6,361,300 B1 | 3/2002 | Kazmer et al. |
| 6,464,909 B1 | 10/2002 | Kazmer et al. |
| 6,554,604 B1 | 4/2003 | Schmidt |
| 7,018,199 B2 | 3/2006 | Tooman |
| 7,121,820 B2 | 10/2006 | Tooman |
| 7,225,953 B1 | 6/2007 | Tooman |
| 7,234,929 B2 | 6/2007 | Vasapoli et al. |
| 7,329,112 B2 | 2/2008 | Tooman |
| 7,419,625 B2 | 9/2008 | Vasapoli et al. |
| 7,569,169 B2 | 8/2009 | Vasapoli et al. |
| 7,588,436 B2 | 9/2009 | Tooman |
| 7,901,604 B2 | 3/2011 | Oberhofer et al. |
| 8,016,581 B2 | 9/2011 | Vasapoli et al. |
| 9,381,691 B2 | 7/2016 | Tooman |
| 9,908,273 B2 | 3/2018 | de Oliveira Antunes |
| 2003/0155672 A1 | 8/2003 | Kazmer |
| 2004/0161490 A1 | 8/2004 | Babin |
| 2009/0061034 A1 | 3/2009 | Vasapoli et al. |

INJECTION MOLDING FLOW CONTROL APPARATUS AND METHOD

This application is a continuation of and claims the benefit of priority to U.S. application Ser. No. 15/432,175 filed Feb. 14, 2017, the disclosure of which is incorporated by reference in its entirety as if fully set forth herein.

BACKGROUND

Injection molding systems have been developed having flow control mechanisms (e.g., a controller) that control the movement and/or rate of movement of a valve pin over the course of an injection cycle to cause the pin to move to one or select positions and/or to control the rate of movement of the pin over the course of the injection cycle. In one embodiment, the pin movement is controlled in order to raise or lower the rate of flow of fluid material to correspond to a predetermined profile of fluid flow rates for the injection cycle. A sensor is typically provided that senses a condition of the fluid material or of the apparatus (such as pin position) and sends a signal indicative of the sensed condition to a program contained in a controller that uses the signal as a variable input to control movement of the valve pin in accordance with the predetermined profile.

SUMMARY OF THE INVENTION

The present invention relates to the storage and transmission of recipe data (process parameters) for the molding of articles in an injection molding machine. A controller includes a flow control microcontroller (MCU) that receives recipe data from a recipe storage microcontroller (MCU) mounted to a mold of an injection molding machine, the recipe storage MCU storing the recipe data defining process parameters for the molding of articles in the mold. The flow control MCU executes instructions for controlling pin motions in the mold according to the recipe data. In one embodiment, a human operator interface is provided for transmitting data to and/or from at least one of the recipe storage and flow control MCU's, allowing the operator to monitor, modify and/or control the process parameters during a molding cycle and/or to create a modified or new recipe for subsequent storage on the recipe storage MCU.

In accordance with one embodiment of the invention, a system is provided comprising a recipe storage microcontroller (MCU) mounted to a mold of an injection molding machine and storing recipe data defining process parameters for molding articles in the mold, wherein the recipe data includes one or more profiles of data representative of events or conditions during or over corresponding injection cycles that control operation of one or more valve pins to control the rate of flow of injection material to the mold over the course of the injection cycles,
a flow controller, including a flow control microcontroller (MCU), remote from the mold and operative to receive the recipe data and execute instructions for controlling valve pin motion(s) according to the recipe data; and
a human operator interface remote from the mold and either remote-from or local-to the controller for transmitting recipe data to and/or from at least one of the recipe storage and flow control MCUs;
wherein each MCU is a single chip microcontroller.

In one embodiment, the system includes a first communication channel between the human operator interface and controller, and a second communication channel between the recipe storage MCU and the controller.

In another embodiment, the flow control MCU is mounted on a circuit board mounted on the injection molding machine.

In another embodiment, the recipe storage MCU is mounted on a circuit board mounted on the mold.

In another embodiment, the system includes a display.

In another embodiment, the display is mounted on the injection molding machine and includes one or more parameters relating to valve pin motion(s).

In another embodiment, the recipe storage MCU is mounted in a junction box and the junction box transmits signals between the mold and the flow control MCU for controlling the valve pin motion(s).

In another embodiment, the profile comprises a profile of one or more of valve pin position, pressure of an injection material, temperature of an injection material or position of another operational component of the system.

In another embodiment, the human operator interface is a voice activated interface.

In another embodiment, the human operator interface is a wireless interface.

In another embodiment, the human operator interface is a wired interface.

In another embodiment, the flow control MCU controls the motions of a plurality of valve pins.

In another embodiment, the system includes a plurality of flow control MCUs each controlling a corresponding one of a plurality of pins.

In another embodiment, the flow control MCU is mounted on a hydraulic power unit.

In one embodiment, at least one flow control MCU, receives, displays and/or records a signal from an electronic mold counting sensor for correlating detected pin motion data to the recipe data during a given molding cycle.

In accordance with one embodiment of the invention, a system is provided comprising a recipe storage microcontroller (MCU) storing recipe data defining process parameters for molding articles in a mold, and a flow controller including a flow control MCU, both the recipe storage MCU and the flow control MCU being mounted to the mold;
the recipe data including one or more profiles of data representative of one or more events or conditions during or over corresponding injection cycles that control operation of one or more valve pins to control the rate of flow of injection material to the mold over the course of the injection cycles;
the flow control MCU being operative to receive the recipe data and execute instructions for controlling valve pin motion(s) in the mold according to the recipe data; and
a human operator interface remote from the mold for transmitting recipe data to and/or from at least one of the MCUs;
wherein each MCU is a single chip data microcontroller.

In one embodiment, the recipe data includes a rate of pin movement.

In another embodiment, the recipe data includes a pressure profile for a molding cycle.

In another embodiment, the flow control MCU generates signals for an electric motor for controlling one or more of pin position and rate of pin movement.

In accordance with one embodiment of the invention, a method is provided comprising electronically transmitting a recipe of data from a human operator interface to a recipe storage system mounted on a mold of an injection molding machine, the recipe storage system including a recipe storage microcontroller (MCU) for storing the recipe, wherein the recipe data includes one or more profiles of data representative of one or more events or conditions during or over corresponding injection cycles that control operation of one or more valve pins to control the rate of flow of injection material to the mold over the course of the injection cycles; a controller, remote from the mold, including a flow control MCU executing computer instructions to control the valve pin motion(s) during a process of molding part(s) in the mold in accordance with the recipe, electronically transmitting feedback concerning the molding process and/or the molded part(s) to the operator interface; and electronically transmitting a modified recipe from the operator interface to the recipe storage system for a subsequent process of molding parts.

In accordance with one embodiment of the invention, a method is provided comprising transmitting, from a mold MCU mounted on a mold of an injection molding machine to a flow control MCU remote from the mold, a recipe of data defining process parameters for molding articles in the mold, wherein the recipe data includes one or more profiles of data representative of one or more events or conditions during or over corresponding injection cycles that control operation of one or more valve pins to control the rate of flow of injection material to the mold over the course of the injection cycles;

transmitting signals from the flow control MCU to an actuating system that controls the molding of articles in the mold according to the recipe;

operating the actuating system according to the signals to produce articles in the mold.

In another embodiment, the method includes transmitting feedback signals, from the actuating system, the mold and/or a manifold mounted to the machine, to the flow control MCU concerning the molding process and/or the molded parts.

In another embodiment, the method includes receiving, at the mold MCU, a modified recipe based on the feedback signals.

In another embodiment, the method includes transmitting, from the mold MCU to the flow control MCU, the modified recipe.

In one embodiment, the method includes transmitting signals from the flow control MCU to the actuating system to control the molding of articles in the mold according to the modified recipe.

In one embodiment, the method includes removing the mold from the machine and inserting a new mold, the new mold including as the recipe a new mold recipe stored on the new mold MCU prior to the inserting step.

In one embodiment, the method includes transmitting the new mold recipe from the new mold MCU to the flow control MCU.

In one embodiment, the method includes transmitting signals from the flow control MCU to the actuating system to control the molding of articles in the mold according to the new mold recipe.

BRIEF DESCRIPTION OF THE DRAWINGS

The above and further advantages of the invention may be better understood by referring to the following description in conjunction with the accompanying drawings in which.

DETAILED DESCRIPTION

Figure 1:
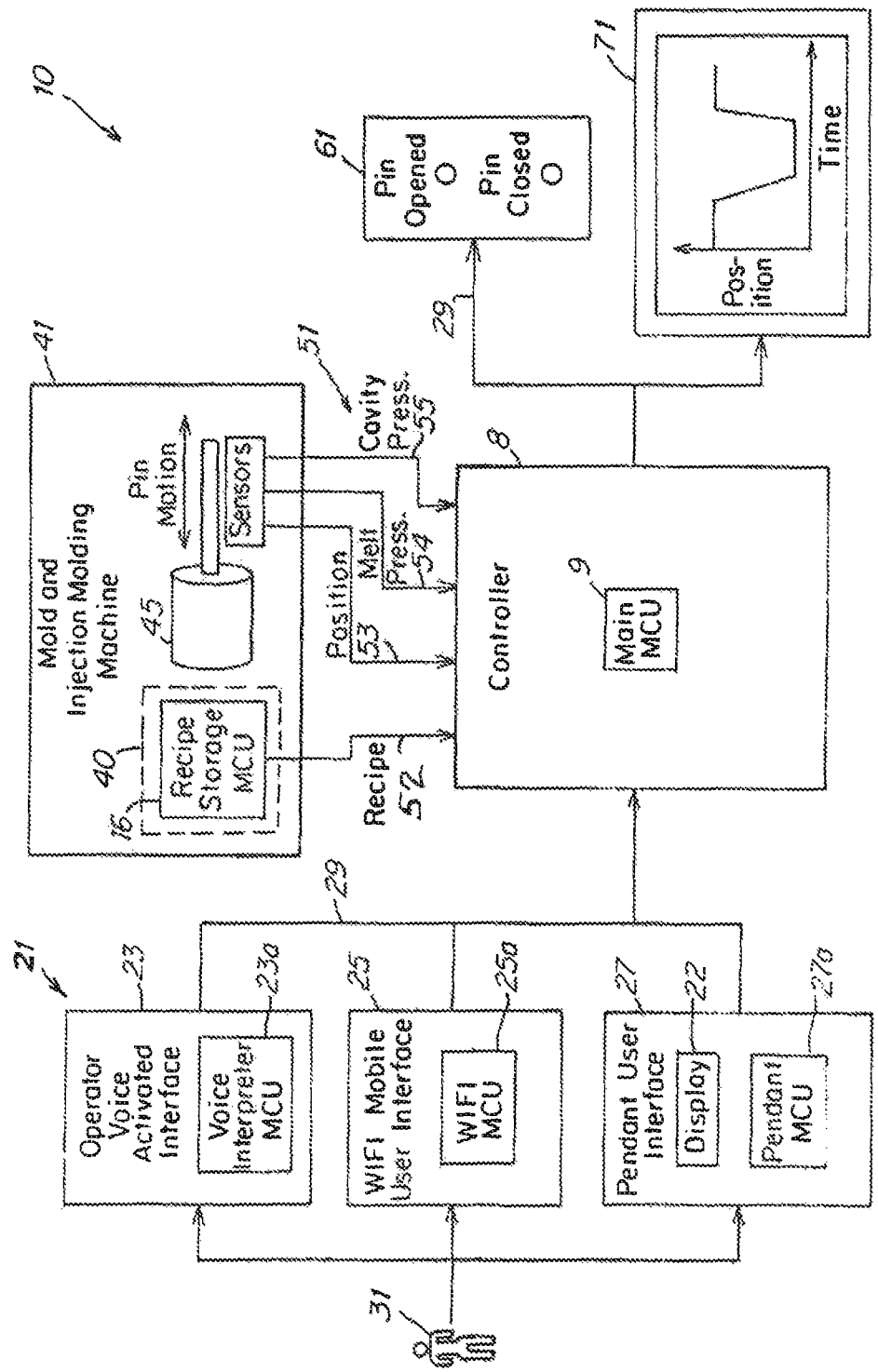
FIG. 1 is a schematic of one embodiment of the invention utilizing microcontrollers (MCUs) for monitoring and/or controlling an injection molding process, the system including a recipe MCU located at the mold and a flow control MCU preferably remote from (optionally local to) the mold, and various human operator interfaces remote from the mold for monitoring and/or providing input to the MCUs with regard to the injection molding process.

Various embodiments of the present invention are now described with reference to the drawings. In the following description, for purposes of explanation, numerous specific details are set forth in order to provide a thorough understanding of one or more implementations of the present invention. It will be evident, however, that the present invention may be practiced without these specific details. In other instances, well-known structures and devices are shown in block diagram form in order to facilitate describing the present invention.

As used in this application with regard to various monitoring and control systems, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The present invention may also be illustrated as a flow chart of a process of the invention. While, for the purposes of simplicity of explanation, the one or more methodologies shown in the form of a flow chart are described as a series of acts, it is to be understood and appreciated that the present invention is not limited by the order of acts, as some acts may, in accordance with the present invention, occur in a different order and/or concurrent with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

In various embodiments of the invention disclosed herein, the term "data" is used. Data means any sequence of symbols (typically denoted "0" and "1") that can be input into a computer, stored and processed there, or transmitted to another computer. As used herein, data includes metadata, a description of other data. Data written to storage may be data elements of the same size, or data elements of variable sizes. Some examples of data include information, program code, program state, program data, other data, and the like.

As used herein, computer storage media includes both volatile and non-volatile, removable and non-removable media for storage of information such as computer-readable instructions, data structures, program modules, or other data. Computer storage media includes RAM, ROM, EEPROM, FLASH memory or other memory technology, CD-ROM, digital versatile disc (DVDs) or other optical disk storage, magnetic cassettes, magnetic tape, magnetic disk storage or other magnetic storage devices, or any other medium which can be used to store desired information and which can be accessed by the computer.

The methods described below may be implemented in a suitable computing and storage environment, e.g., in the context of computer-executable instructions that may run on one or more processors, microcontrollers or other computers. In a distributed computing environment (for example) certain tasks are performed by remote processing devices that are linked through a communications network and program modules may be located in both local and remote memory storage devices. The communications network may include a global area network, e.g., the Internet, a local area network, a wide area network or other computer network. It will be appreciated that the network connections described herein are exemplary and other means of establishing communications between the computers may be used.

A computer may include one or more processors and memory, e.g., a processing unit, a system memory, and system bus, wherein the system bus couples the system components including, but not limited to, the system memory and the processing unit. A computer may further include disk drives and interfaces to external components. A variety of computer-readable media can be accessed by the computer and includes both volatile and nonvolatile media, removable and nonremovable media. A computer may include various user interface devices including a display screen, touch screen, keyboard or mouse.

A microcontroller (MCU) is used in the present invention to control some or all of the functions of an electronic device or system. An MCU is a small self-contained computer chip, essentially comprising a small computer on a single integrated circuit and including a microprocessor, memory, and I/O on a single chip. The chip may be programmed for select functions, the program code being stored on Flash, EPROM or other non-violate memory. An MCU is used in each of a recipe storage system, a flow control system, and a user interface system in the embodiment described below. The MCU may be embedded in a printed circuit board (PCB), e.g., within the main PCB of the controller, a PCB within a storage device (in a junction box) and/or a PCB within an input device (such as a voice input interface). In contrast, PLC's (programmable logical controllers) are costly and not as effective (too slow and/or offer limited functionality).

Flow Control Apparatus and Method

FIG. 1 is a schematic diagram of a flow control apparatus and method according to one embodiment of the invention. In the disclosed embodiment, a recipe storage MCU and flow control MCU replace the prior known controller, and preferably communicate with a new operator interface. It is to be understood that the new flow control apparatus and method can be used with various injection molding machines and molding processes known to the skilled person.

In the advanced flow control system 10 of the present embodiment, a controller 8 includes a flow control microcontroller (MCU) 9, also referred to as the main MCU. The main MCU is operative to communicate (over wired or wireless media 29) with one or more types of user interfaces 21 including for example a voice activated interface 23, a mobile (wi-fi) interface 25, and a wired interface 27. A user (human operator) 31 can input to the interface 21 various process parameters, such as inputs to a recipe for controlling various types of actuators used in the molding process. The inputs will be transmitted from the user interface to the main flow control MCU. The flow control MCU in turn communicates (over wired or wireless media 51) with a remote recipe storage MCU 16 mounted on a mold 40 of an injection molding apparatus 41 (also referred as to an injection molding machine). The mold includes one or more pins (see FIG. 6) each driven by an actuator 45 for opening and closing one or more respective mold cavities (see FIG. 6). The actuator may be any type of known actuator, including electrical, hydraulic, or pneumatic actuators. The actuator drives a pin for opening and closing a gate (an opening into the mold cavity), and the movement of the pin may be monitored by one or more sensors or signals on/from the mold 40 or machine 41 for determining one or more process parameters such as pin position, pin velocity, or melt pressure in the cavity or in a fluid channel upstream of the cavity (e.g., manifold), or temperature in the cavity or in a fluid channel upstream of the cavity, or the mold cycle count. The recipe, for a respective mold, is stored in the recipe storage MCU 16 which is mounted on the mold 40, and the recipe is electronically transmitted from the recipe MCU 16 to the main MCU 9, remote from the mold, the latter of which implements computer instructions for controlling various parameters related to the molding process of the respective mold in accordance with the recipe.

In one example, the flow control (main) MCU 9 will automatically obtain or receive the recipe of process parameters (e.g., set-up information) from the remote recipe MCU 16 which is located on the mold. This allows for uninterrupted mold changes, namely the mold and its associated recipe will be read automatically by the flow control MCU 9, without requiring programming of the flow control MCU. The transmitted recipe data can be implemented by executing the flow control computer instructions stored on the flow control MCU 9. For example, the flow control MCU can be used to control the velocity of the pin(s), maintain the melt pressure at a desired melt pressure profile, and/or sequence the pin(s) in a mold using various other inputs.

Furthermore, the flow control (main) MCU 9 receives as input(s) from the mold 40 and/or machine 41 one or more electronic signals (digital or analog), over communication channels 51, indicative of the molding process, thus providing a feedback loop for one or more process parameters, e.g., for pressure control based on melt pressure and/or cavity pressure. This feedback can be provided or displayed to an operator 31, allowing the operator to input changes to the recipe, and the modified recipe can then be executed by the main MCU (as the new current recipe).

In one embodiment, the recipe storage MCU 16 is mounted on an electrical junction box (a container for electrical connections) which allows for communications between the mold 40 and the flow control MCU 9 in order to retrieve and store recipes on the mold MCU 16. In addition to communicating the recipe data, the flow control MCU can interact (e.g., via the junction box) with various optional sensors and signals on/from the mold and machine, such as position sensors, melt pressure sensors, cavity pressure sensors, temperature sensors, screw position and other injection molding machine signals to control the actuation of each pin in the mold, or the mold cycle count. FIG. 1 shows various signals, including recipe 52, position 53, melt pressure 54 and cavity pressure 55, being electronically transmitted from the mold machine to the remote main MCU 9, e.g., via wired or wireless communication channel(s).

As previously described, the user interface 21 enables a user 31 (human operator) to observe the tracking of the actual process parameters, versus the target (desired) process parameters, during the injection cycle in real time, or after the cycle is complete. In one example, the interface 21 includes an associated display 22 for tracking such parameters. One type of display is a simple indicator panel (similar to panel 61 shown in communication with the controller 8) that tells the operator whether the valve pin is open or closed. In this example, the control system can transmit discrete signals indicating whether the valve pin is closed or opened.

In another example, a display (such as display 71) is provided that enables continuous position monitoring of the pin, by the user. In this example, the control system 8 transmits a signal to drive a display showing (e.g., in a graph of position versus time) the position of the valve pin throughout the injection cycle.

The display(s) can be either local or remote with respect to the flow control MCU, the user interface, and/or the mold. In one example, the pin open/closed indicator panel 61 is mounted on the injection molding machine 41. In another example, the graphical display 71 (of pin position versus time) is provided on the user interface 21, such as on a display screen of a mobile telephone, smartphone, tablet or other computer device.

In one embodiment, the user interface 21 is a voice activated interface 23 and includes a voice interpreter MCU 23a. Such an interface may utilize any of various readily available components, such as a voice recognition chip. As the operator will typically have fairly specific and a limited range of inputs (commands), any of various commercially available voice recognition software can be used. For example, RSC-364 is a single chip that combines the flexibility of a microcontroller with advanced speech technology, including high-quality speech recognition, speech and music synthesis, speaker verification, and voice record and playback. A product can use one or all of the RSC-364 features in a single application. See http://www.sensoryinc.com/.

In another embodiment, the operator interface 21 is a mobile interface 25, such as a WIFI interface, that can be accessed via a local wireless hot spot. The wireless device can be any of various mobile laptops, tablets, smartphones, or other forms of computers, that can run applications and/or a browser. In one example, a WIFI MCU 25a receives input via the mobile device from the human operator 31 and communicates parameters/commands to the flow control MCU 9. This would enable the operator to travel around an injection molding facility or plant, while inputting commands. Further, assuming the mobile device includes a display screen providing process feedback on the existing profile data, the operator can then generate and transmit changes to the recipe from the user interface to the mold MCU 16 (either directly or via the main MCU 9). The modified recipe can then be stored at the mold MCU 16 as the (new) current recipe.

In a further alternative, the user interface 21 is a hardwired interface 27 (including e.g., display 22 and pendent MCU 27a as shown in FIG. 1), such as a desktop computer or computer device with an input keyboard or graphical user interface. The one or more interfaces 23, 25, 27 can be connected to the main MCU 9 of controller 8 via wired or wireless communication channels 29.

Flow Control Method

Figure 2:
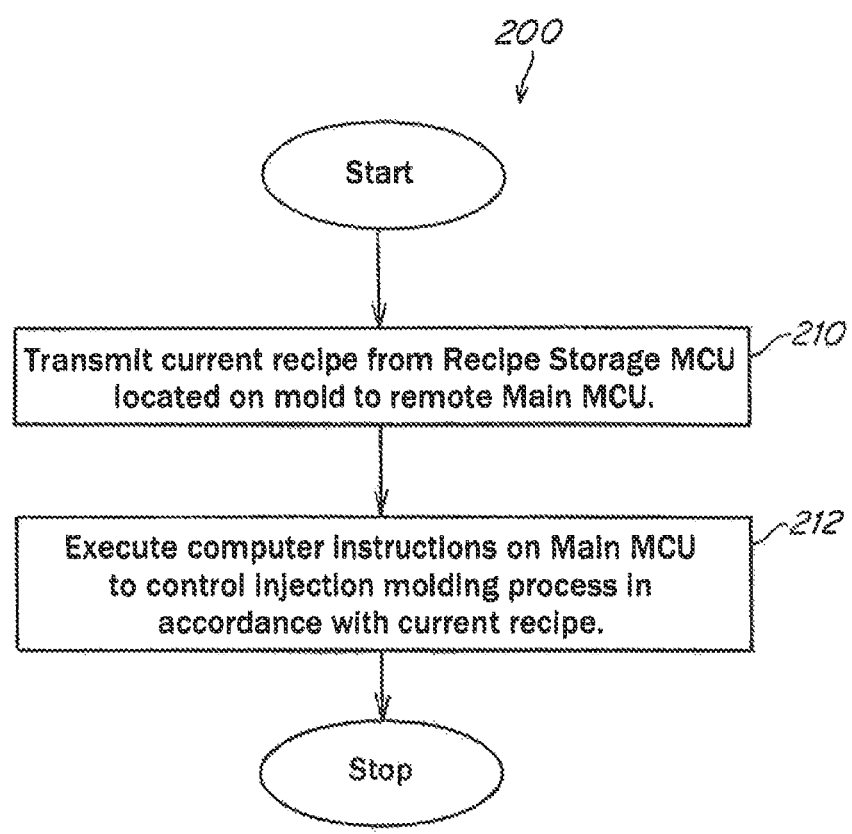
FIG. 2 is a flow chart illustrating one method embodiment of the invention.

FIG. 2 illustrates one method embodiment 200 of the invention. In step 210, the current recipe stored on a recipe storage MCU located on the mold, is transmitted to the remote main MCU. In the next step 212, the main MCU executes computer instructions to control the injection molding process in accordance with the current recipe.

Figure 3:
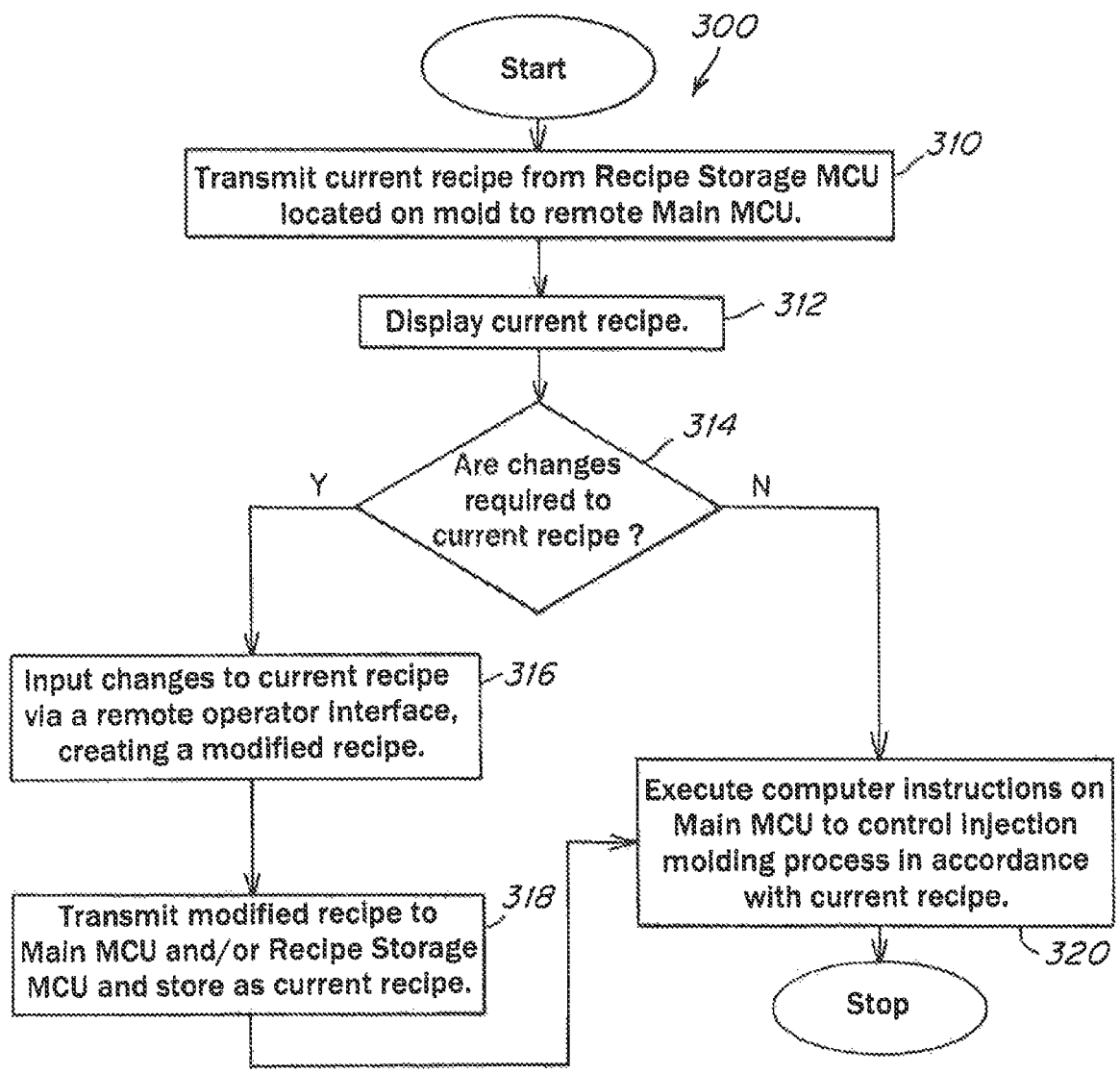
FIG. 3 is a flow chart illustrating another method embodiment of the invention.

Another method embodiment 300 of the invention is illustrated in FIG. 3. In a first step 310, the current recipe is transmitted from the recipe storage MCU located on the mold to the remote main MCU and stored as the (new) current recipe. In a next step 312, the current recipe is displayed. In step 314, a human operator (viewing the display) determines whether changes are required to the current recipe. If changes are required, then in step 316 the operator inputs changes to the current recipe via a remote human operator interface, creating a modified recipe. Next, at step 318, the modified recipe is transmitted to the main MCU and/or recipe storage MCU and stored as the (new) current recipe. Then the method proceeds to step 320, where the main MCU executes computer instructions to control the injection molding process in accordance with the current (modified) recipe. Alternatively, if no changes are required to the current recipe (at step 314), then the method proceeds immediately to step 320 to execute the computer instructions in accordance with the current (unmodified) recipe.

Figure 4:
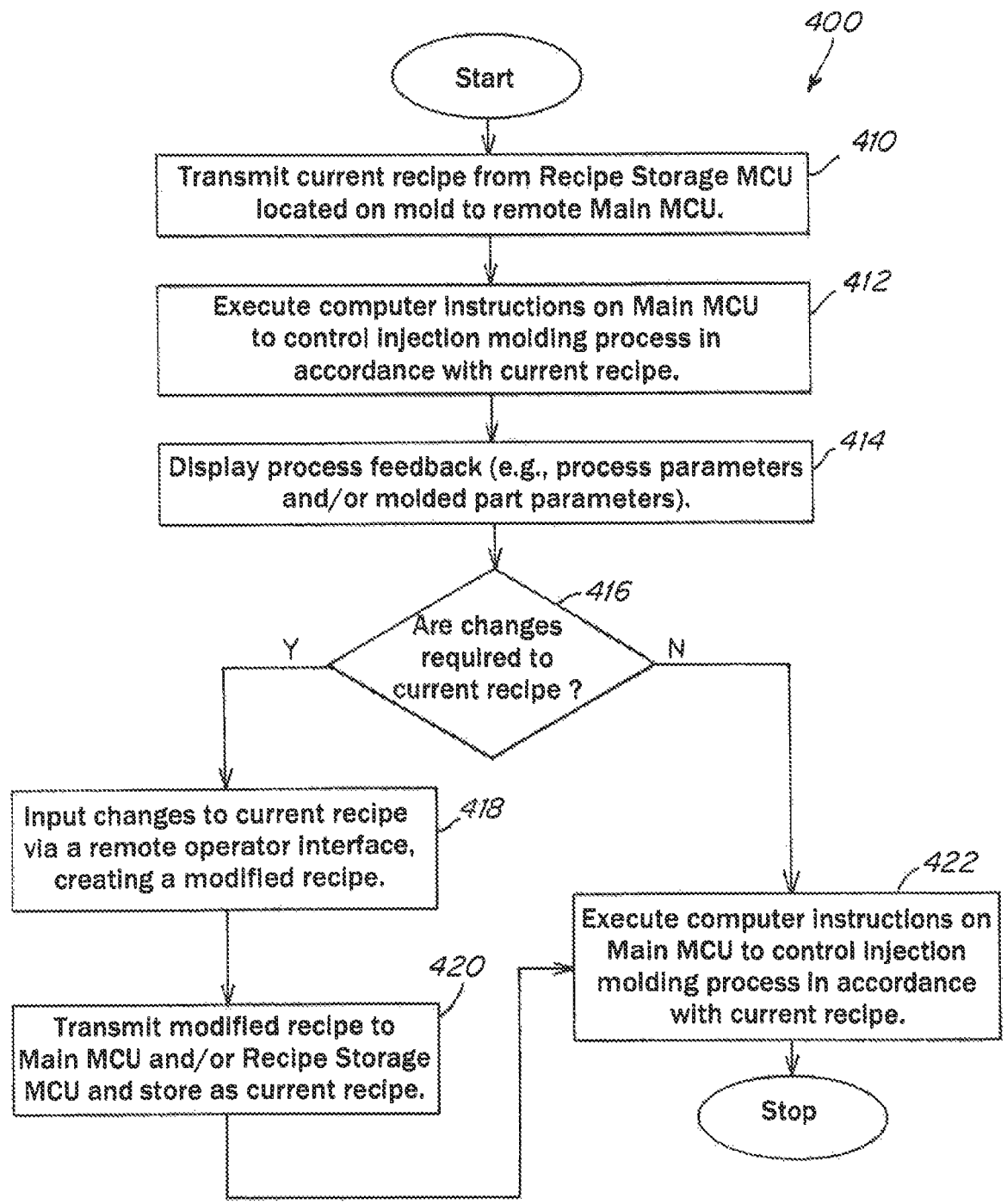
FIG. 4 is a flow chart illustrating another method embodiment of the invention.

FIG. 4 illustrates another method embodiment 400 of the invention. In a first step 410, the current recipe is transmitted from the recipe storage MCU located on the mold to the remote main MCU. In the next step 412, the main MCU executes computer instructions to control the injection molding process in accordance with the recipe. In the next step 414, process feedback is displayed, for example process parameters and/or molded part parameters from which the human operator can determine whether to make changes to the recipe. In the next step 416, the human operator determines whether changes to the current recipe are required. If so, in the next step 418 the operator inputs changes to the current recipe via a remote operator interface creating a modified recipe. In the next step 420, the modified recipe is transmitted to the main MCU and/or the recipe storage MCU. In the next step 422, the main MCU executes computer instructions to control the injection molding process in accordance with the new current (modified) recipe. Alternatively, if no changes are required (at step 414), then the method proceeds directly to step 422 to execute the computer instructions in accordance with the current (unmodified) recipe. In an optional further feedback loop, during or after step 422 the process returns to step 414 to display process feedback, wherein the operator can then determine at step 416 whether to further modify the current (or previously modified) recipe.

Figure 5:
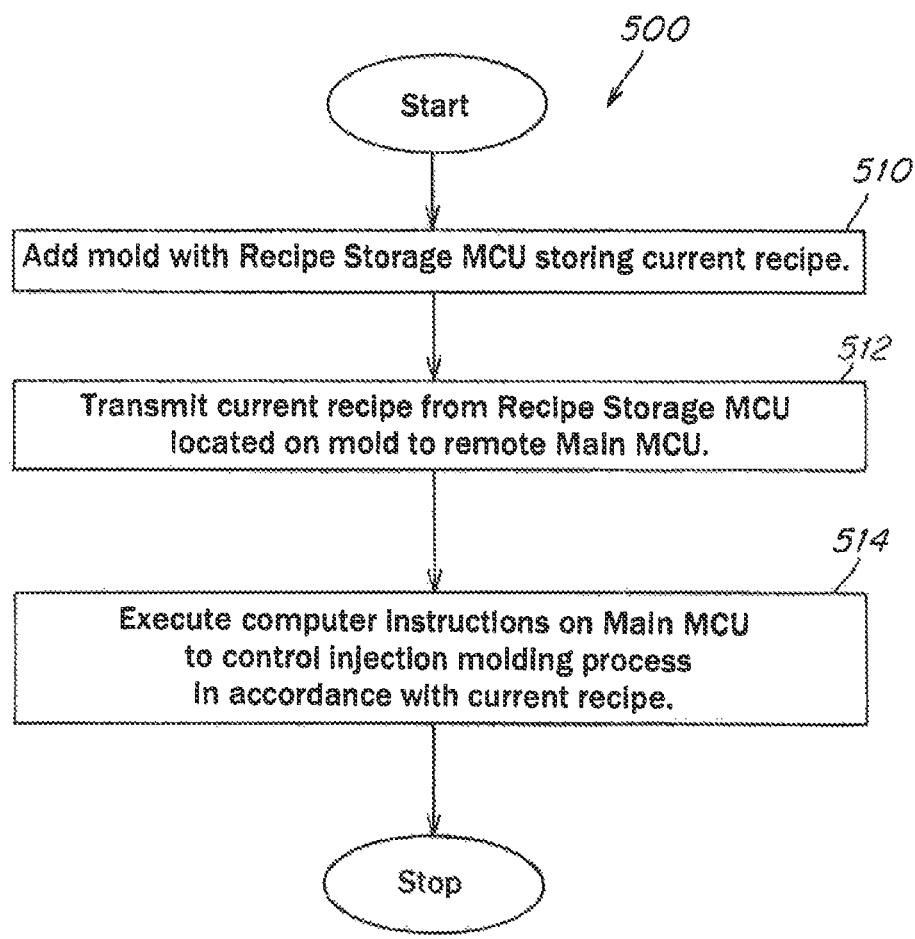
FIG. 5 is a flow chart illustrating another method embodiment of the invention.

FIG. 5 illustrates a further method embodiment 500 of the invention. In a first step 510, a mold is added or changed having a recipe storage MCU located on the mold storing the current recipe. In a next step 512, the current recipe is transmitted from the recipe MCU located on the mold to the remote main MCU. In a next step 514, the main MCU executes computer instructions to control the injection molding process in accordance with the current recipe. Thus, the method illustrated in FIG. 5 would allow a mold operator, such as a night-shift operator, to change the mold without having to input which recipe to run. The control system (e.g., of FIG. 1) will automatically identify the mold and run the current recipe stored on the mold without any human operator input required.

Injection Molding Apparatus and Method

Figure 6:
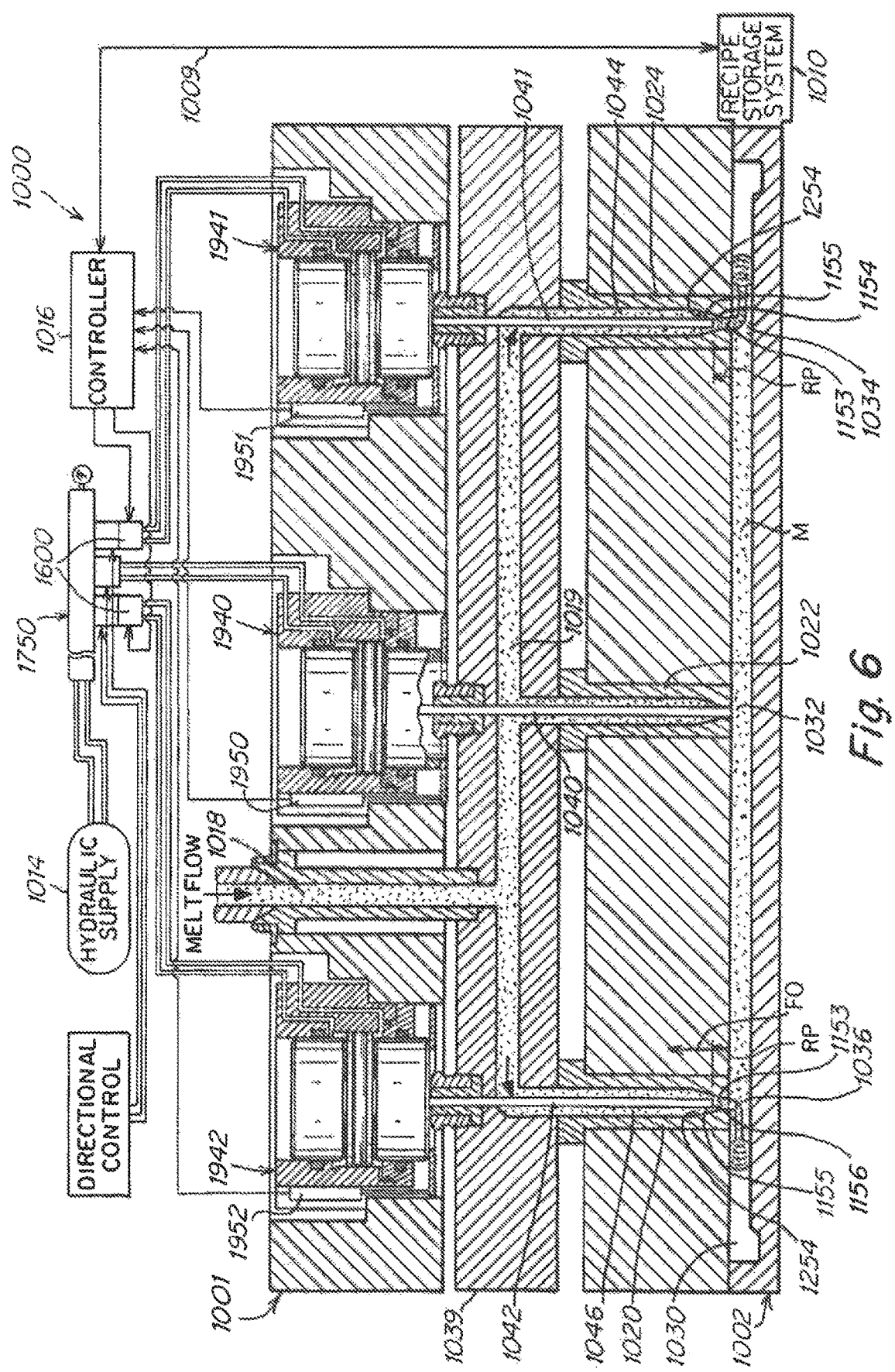
FIG. 6 is a schematic of one embodiment of an injection molding apparatus utilizing the invention during an injection molding cycle, namely a recipe (of process parameters) stored on a recipe storage system mounted in a mold is transmitted to and executed by a controller, the molding apparatus including a pair of sequential gates with a first gate entering a center portion of a mold cavity having been opened and now closed such that a first shot of fluid material has entered the cavity and traveled past the positions of a pair of second sequential gates (one at each end of the mold cavity), each second gate being open with its valve pin having traveled along an upstream restricted flow path RP allowing a second sequential shot of fluid material to flow into and merge with the first shot of material within the cavity.

FIG. 6 shows an injection molding system 1000, including a controller 1016 (with a flow control MCU 9 as per FIG. 1) and a recipe storage system 1010 (with a recipe storage MCU 16 as per FIG. 1), the latter of which is mounted on a mold 1002 according to one embodiment of the invention. In this example, three gates feed a mold cavity as specified by a recipe of process parameters stored on the mold storage device 1010 and transmitted via communication channel 1009 to the main MCU in controller 1016 for execution.

A central nozzle 1022 is shown in FIG. 6 feeding molten material from an injection molding machine 1001 through a main inlet 1018 to a distribution channel 1019 of a manifold 1039. The distribution channel commonly feeds three separate nozzles 1020, 1022, 1024 which all commonly feed into a common cavity 1030 of a mold 1002 to make one molded part. A central nozzle 1022 is controlled by actuator 1940 and arranged so as to feed into cavity 1030 at an entrance point or gate that is disposed at about the center 1032 of the cavity. As shown, a pair of lateral nozzles 1020, 1024 feed into the mold cavity 1030 at gate locations that are distal 1034, 1036 to the center gate feed position 1032.

Figure 6A:
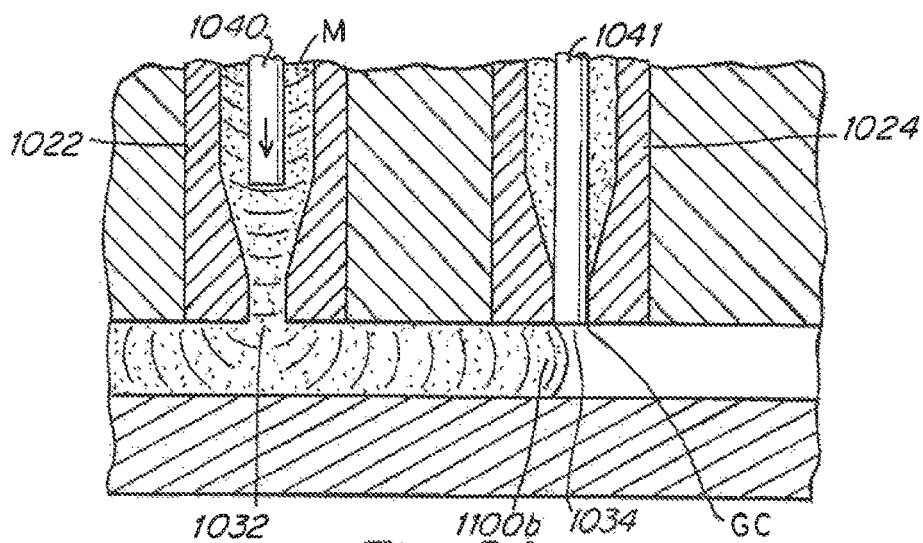
FIGS. 6A-6E are schematic cross-sectional close-up views of the center and one of the lateral gates of the FIG. 6 apparatus showing various stages of the progress of injection.
Figure 6B:
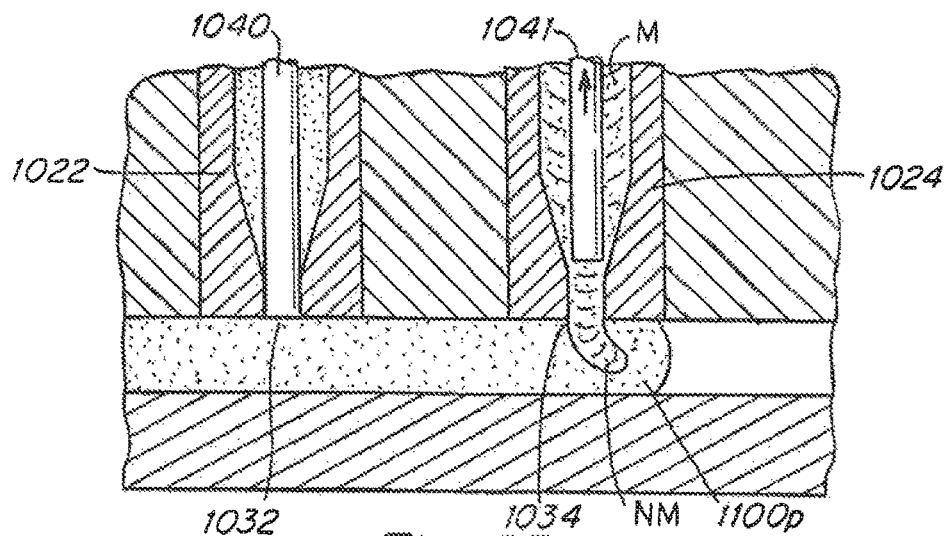
Figure 6C:
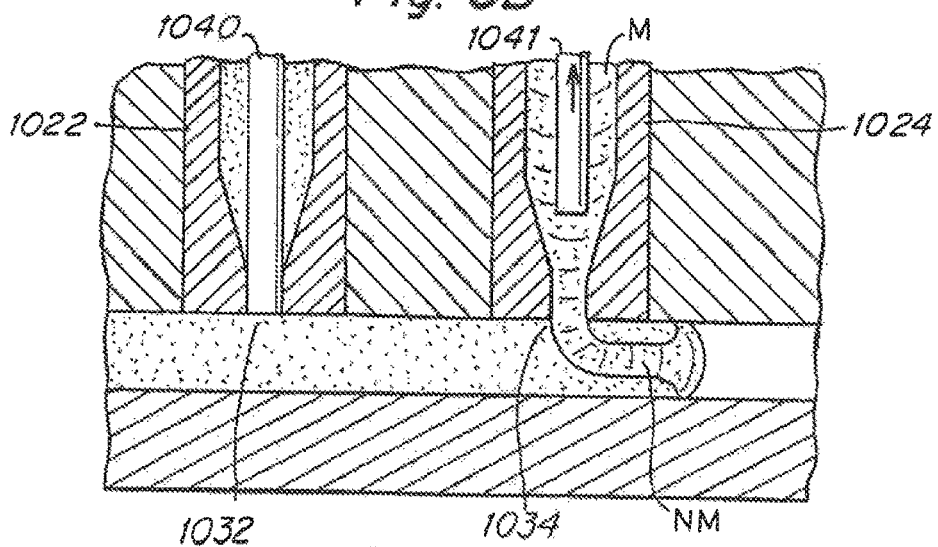

As shown in FIGS. 6 and 6A-6E, the injection cycle is a cascade process where injection is effected in a sequence from the center nozzle 1022 first and at a later predetermined time from the lateral nozzles 1020, 1024. As shown in FIG. 6A the injection cycle is started by first opening the pin 1040 of the center nozzle 1022 and allowing the fluid material M (typically polymer or plastic material) to flow up to a position in the cavity just before 1100b, the distally disposed entrance into the cavity of the lateral nozzle 1024. Once the fluid material has further travelled just past the entrance to nozzle 1024, at position 1100p, the center gate 1032 of the center nozzle 1022 is typically closed by pin 1040 as shown in FIG. 6B. The lateral gates 1034, 1036 are then opened by upstream withdrawal of lateral nozzle pins 1041, 1042 as shown in FIGS. 6B-6E. The rate of upstream withdrawal or travel velocity of lateral pins 1041, 1042 is controlled as described below.

In alternative embodiments, the center gate 1032 and associated actuator 1940 and valve pin 1040 can remain open at, during and subsequent to the times that the lateral gates 1034, 1036 are opened such that fluid material flows into cavity 1030 through both the center gate 1032 and one or both of the lateral gates 1034, 1036 simultaneously.

When the lateral gates 1034, 1036 are opened and fluid material NM is allowed to first enter the mold cavity into the stream M that has been injected from center nozzle 1022 past gates 1034, 1036, the two streams NM and M mix with each other. If the velocity of the fluid material NM is too high, such as often occurs when the flow velocity of injection fluid material through gates 1034, 1036 is at maximum, a visible line or defect in the mixing of the two streams M and NM will appear in the final cooled molded product at the areas where gates 1034,1036 inject into the mold cavity. By injecting NM at a reduced flow rate for a relatively short period of time at the beginning when the gates 1034, 1036 are first opened and following the time when NM first enters the flow stream M, the appearance of a visible line or defect in the final molded product can be reduced or eliminated.

The rate or velocity of upstream withdrawal of lateral pins 1041, 1042 starting from the closed position is controlled via controller 1016 (FIGS. 6 and 7) which controls the rate and direction of flow of hydraulic fluid from a drive system 1700 to actuators 1940, 1941, 1942. A "controller," as used generally herein, refers to electrical and electronic control apparati that comprise a single box or multiple boxes (typically interconnected and communicating with each other) that contain(s) all of the separate electronic processing, memory and electrical signal generating components that are necessary or desirable for carrying out and constructing the methods, functions and apparatuses described herein. Such electronic and electrical components may include programs, microprocessors, computers, PID controllers, voltage regulators, current regulators, circuit boards, motors, batteries and instructions for controlling any variable element discussed herein such as length of time, degree of electrical signal output and the like. For example a component of a controller, as that term is used herein, includes programs, controllers and the like that perform functions such as monitoring, alerting and initiating an injection molding cycle including a control device that is used as a standalone device for performing conventional functions such as signaling and instructing an individual injection valve or a series of interdependent valves to start an injection, namely move an actuator and associated valve pin from a gate closed to a gate open position. In addition, although fluid driven actuators are employed in the disclosed embodiments, actuators powered by an electric or electronic motor or drive source can alternatively be used as the actuator component. Another embodiment would have the controller dynamically control the movement of an actuator and associated valve pin in order to meet target pressure profiles based upon (closed loop) feedback received by the controller from the pressure sensor. Yet another embodiment would have the controller trigger the opening and/or closing of an actuator and associated valve pin based upon a sensed pressure or temperature condition within the cavity.

Figure 7:
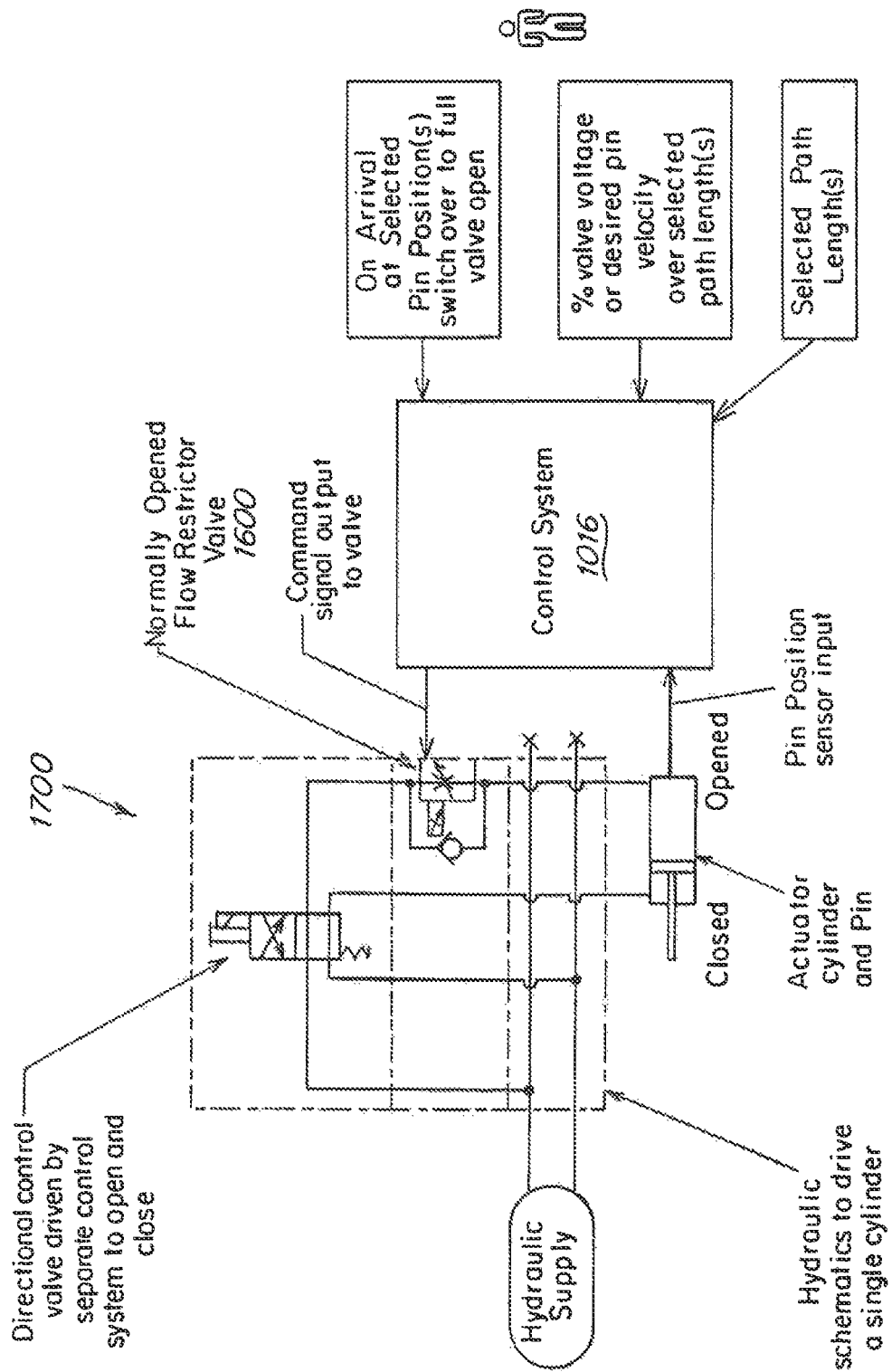
FIG. 7 is a schematic of one embodiment of a hydraulically actuated valve pin in which at least one port of an actuator is connected to a flow restrictor so as to restrict the flow of hydraulic drive fluid and slow the opening of the valve pin by a selected lessening of pin opening velocity by use of a controller interconnected to the flow restrictor, the controller enabling the user to select a percentage of predetermined full open position velocity that the hydraulic drive supply to the actuator normally operates at full open velocity drive fluid pressure.
Figure 7A:
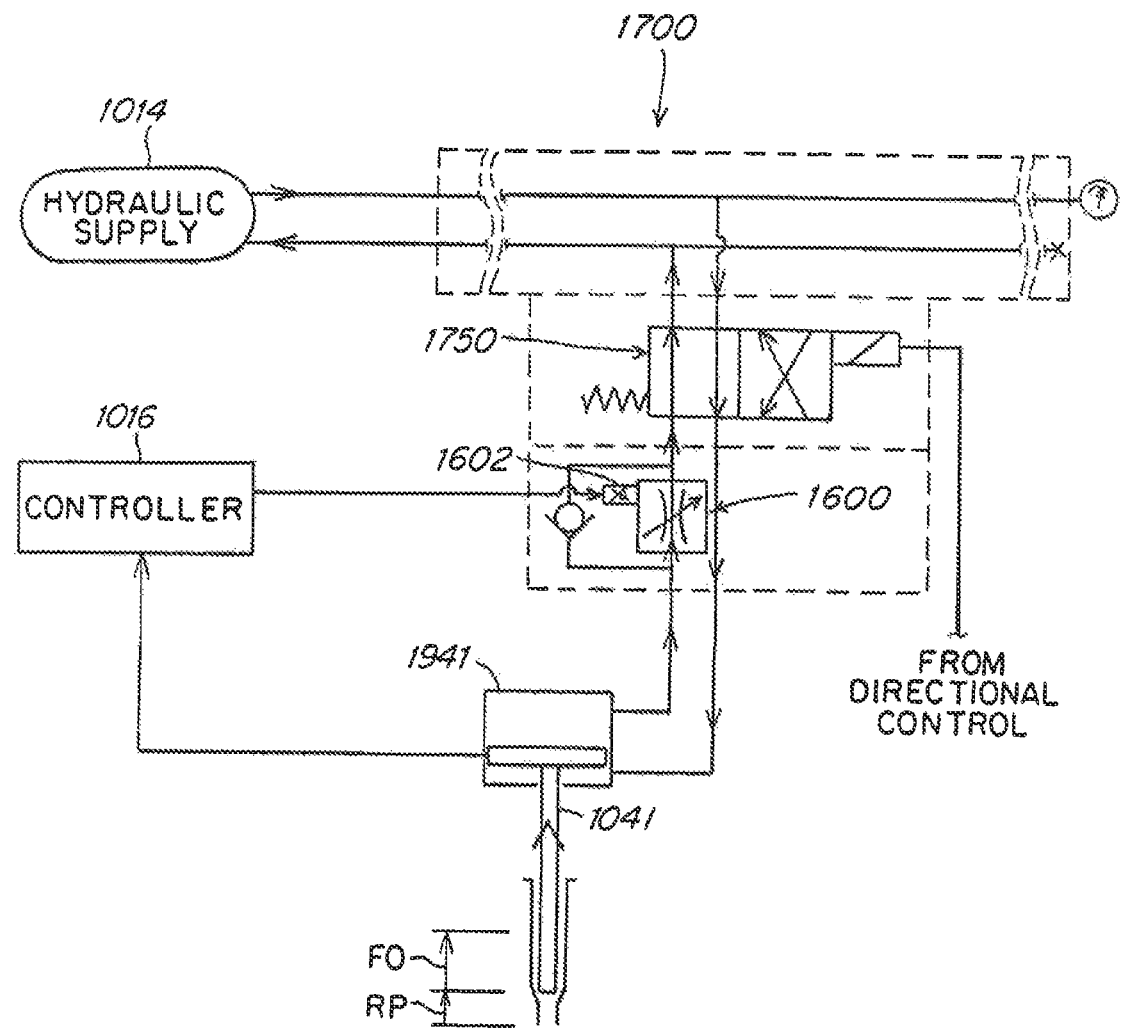
FIGS. 7A, 7B are schematic cross-sectional views of the hydraulic valves and restrictors used in the system of FIG. 6.
Figure 7B:
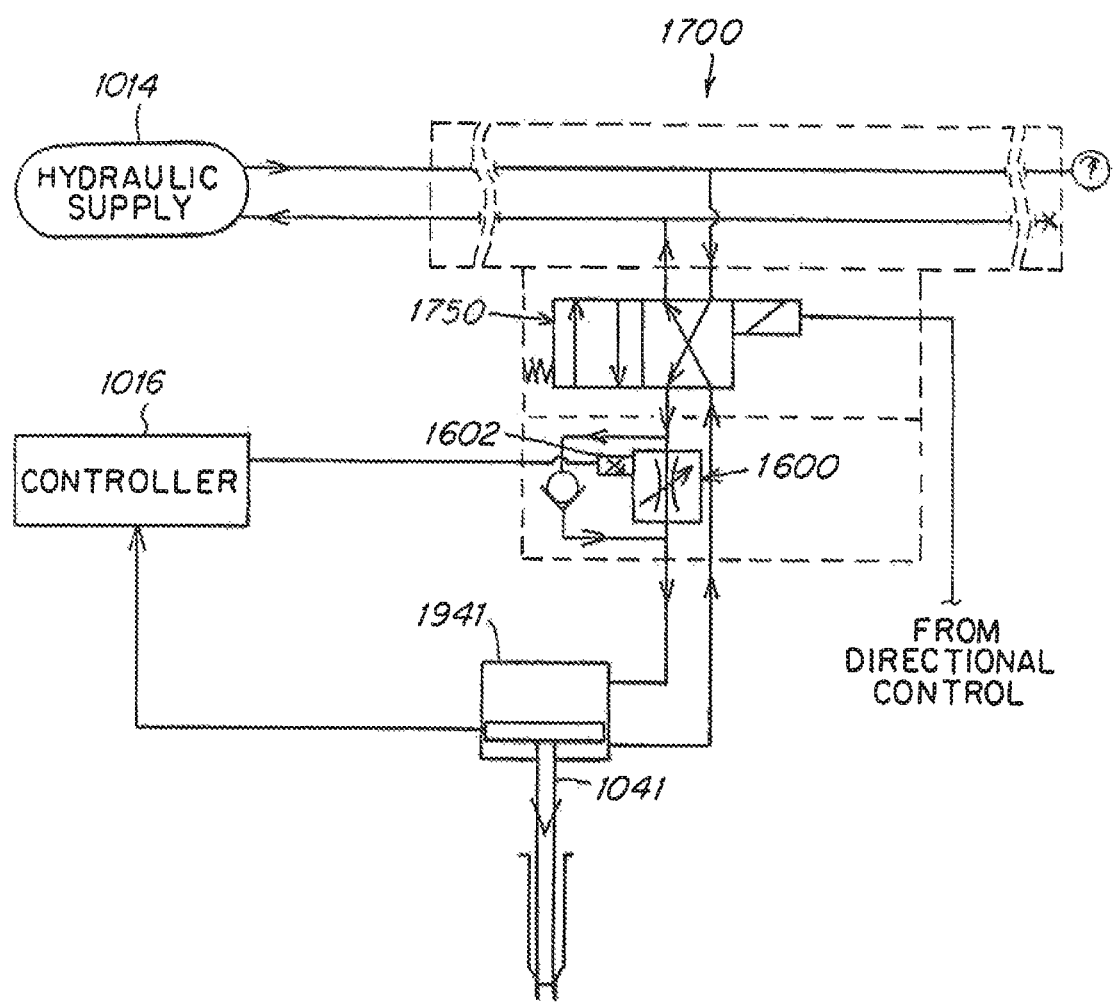

As shown in FIGS. 7A-7B, a supply of hydraulic fluid 1014 is fed first through a directional control valve 1750 mechanism that switches the hydraulic fluid flow to the actuator cylinders in either of two directions: fluid out to withdraw the pin upstream, FIG. 7A, and fluid in to drive the pin downstream, FIG. 7B. At the beginning of an injection cycle the gate of a lateral valve 1034, 1036 is closed and the hydraulic system is in the directional configuration of FIG. 7B. When a cycle is started, the directional configuration of the directional valve 1750 of the hydraulic system 1700 is switched by controller 1016 to the configuration of FIG. 7A. The hydraulic system includes a flow restriction valve 1600 that can vary the rate of flow of hydraulic fluid to the actuator 1941 under the control of the controller 1016 to vary the rate of travel, upstream or downstream of the piston of the actuator 1941 which in turn controls the direction and rate of travel of pin 1041. Although not shown in FIGS. 7A, 7B, the hydraulic system 1700 controls the direction and rate of travel of the pistons of actuators 1950 and 1952 in a manner similar to the manner of control of actuator 1951 via the connections shown in FIG. 6.

The user programs controller 1016 via data inputs on a user interface to instruct the hydraulic system 1700 to drive pins 1041, 1042 at an upstream velocity of travel that is reduced relative to a maximum velocity that the hydraulic system can drive the pins 1041, 1042 to travel. As described below, such reduced pin withdrawal rate or velocity is executed until a position sensor such as 1951, 1952 detects that an actuator 1941, 1942 or an associated valve pin (or another component), has reached a certain position such as the end point of a restricted flow path RP. A typical amount of time over which the pins are withdrawn at a reduced velocity is between about 0.01 and 0.10 second, the entire injection cycle time typically being between about 0.3 seconds and about 3 seconds, more typically between about 0.5 seconds and about 1.5 seconds.

Figure 6D:
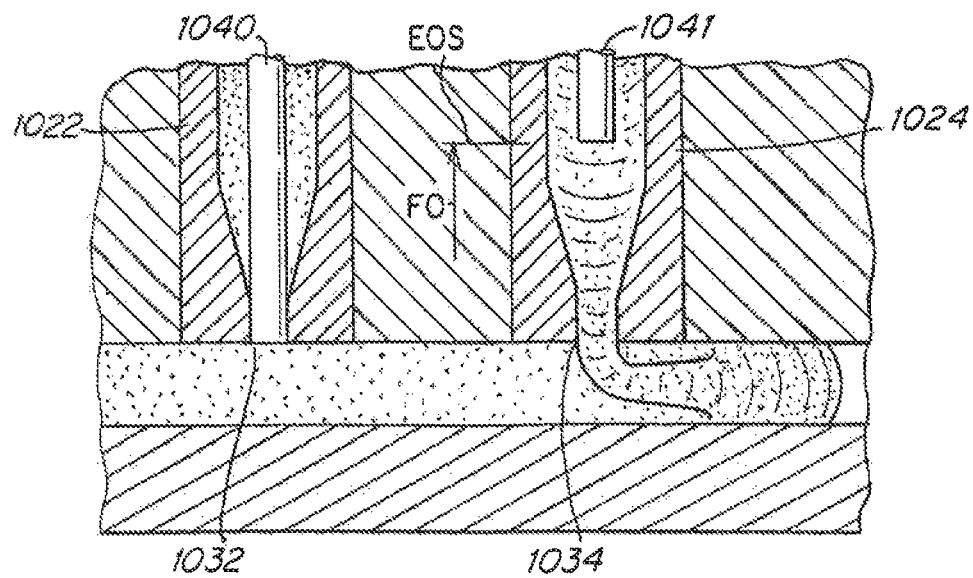
Figure 6E:
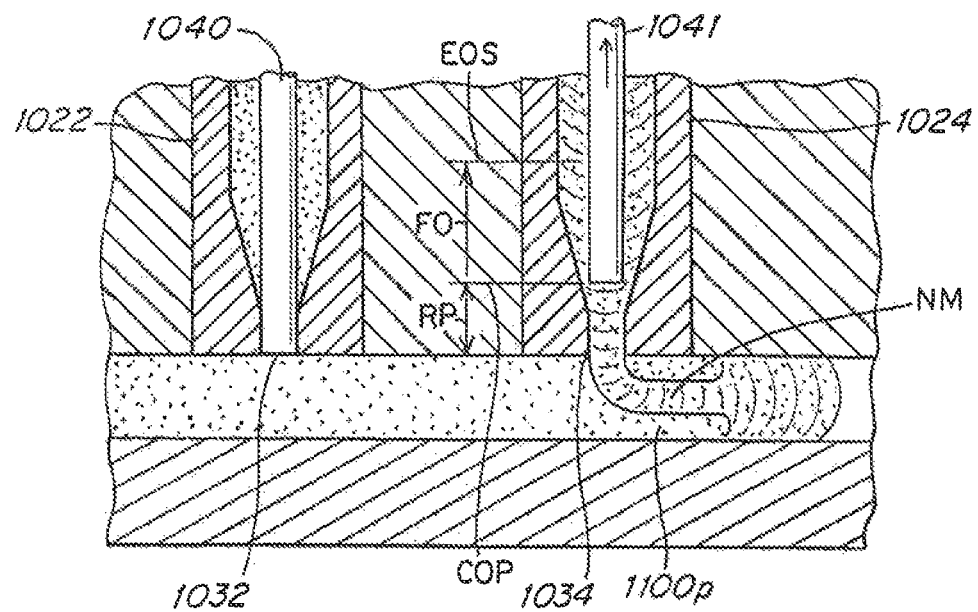

FIG. 6 shows position sensors 1950, 1951, 1952 for sensing the position of their respective actuator cylinders (1940, 1941, 1942) and their associated valve pins (1040, 1041, 1042) and feeding such position information to controller 1016 for monitoring purposes. As shown, fluid material 1018 is injected from an injection machine into a manifold runner 1019 and further downstream into the bores 1044, 1046 of the lateral nozzles 1024, 1022 and ultimately downstream through the gates 1032, 1034, 1036. When the pins 1041, 1042 are withdrawn upstream to a position where the tip end of the pins 1041, 1042 are in a fully upstream open FO position such as shown in FIG. 6D, the rate of flow of fluid material through the gates 1034, 1036 is at a maximum. However when the pins 1041, 1042 are initially withdrawn beginning from the closed gate position, FIG. 6A, to intermediate upstream positions, FIGS. 6B, 6C, a gap 1154, 1156 that restricts the velocity of fluid material flow is formed between the outer surfaces 1155 of the tip end of the pins 1044, 1046 and the inner surfaces 1254, of the gate areas of the nozzles 1024, 1020. The restricted flow gap 1154, 1156 remains small enough to restrict and reduce the rate of flow of fluid material M through gates 1034, 1036 to a rate that is less than maximum flow velocity over a travel distance RP of the tip end of the pins 1041, 1042 going from closed to upstream as shown in FIGS. 6, 6B, 6C, 6E.

The trace or visible lines that appear in the body of a part that is ultimately formed within the cavity of the mold on cooling above can be reduced or eliminated by reducing or controlling the velocity of the pin 1041, 1042 opening or upstream withdrawal from the gate closed position to a selected intermediate upstream gate open position that is preferably 75% or more of the length of RP. RP can be about 1-8 mm in length and more typically about 2-6 mm and even more typically 2-4 mm in length. As shown in FIG. 7 in such an embodiment, a control system or controller 1016 is programmed to control the sequence and/or the rates of valve pin 1040, 1041, 1042 opening and/or closing.

The velocity of withdrawal of the valve pins 1041, 1042 is determined by regulation of the flow of hydraulic drive fluid that is pumped from a supply 1014 to the actuators 1941, 1942 through a flow restrictor valve 1600, FIGS. 6-7. When the flow restrictor valve 1600 is completely open, namely 100% open, allowing maximum flow of the pressurized hydraulic fluid to the actuator cylinders, the valve pins 1041, 1042 are driven at a maximum upstream travel velocity. The degree of openness of the flow restrictor valve is adjusted in response to sensing of position of a suitable component such as an actuator 1941, 1942 or associated valve pin to less than 100% open. Adjustment of the flow restrictor valve 1600 to less than 100% open thus reduces the rate and volume flow of pressurized hydraulic fluid to the actuator cylinders thus in turn reducing the velocity of upstream travel of the pins 1041, 1042 for the selected period of time. At the end of the travel or length of path RP, a position sensor signals the controller 1016, the controller 1016 determines that the end has been reached and the valve 1600 is opened to a higher velocity, typically to its 100% open position to allow the actuator pistons and the valve pins 1041, 1042 to be driven at maximum upstream velocity in order to reduce the cycle time of the injection cycle.

The valve 1600 typically comprises a restrictor valve that is controllably positionable anywhere between completely closed (0% open) and completely open (100% open). Adjustment of the position of the restrictor valve 1600 is typically accomplished via a source of electrical power that controllably drives an electromechanical mechanism that causes the valve to rotate such as a rotating spool that reacts to a magnetic or electromagnetic field created by the electrical signal output of the controller 1016, namely an output of electrical energy, electrical power, voltage, current or amperage the degree or amount of which can be readily and controllably varied by conventional electrical output devices. The electro-mechanism is controllably drivable to cause the valve 1600 to open or close to a degree of openness that is proportional to the amount or degree of electrical energy that is input to drive the electro-mechanism. The velocity of upstream withdrawal travel of the pins 1041, 1042 are in turn proportional to the degree of openness of the valve 1600.

Figure 8A:
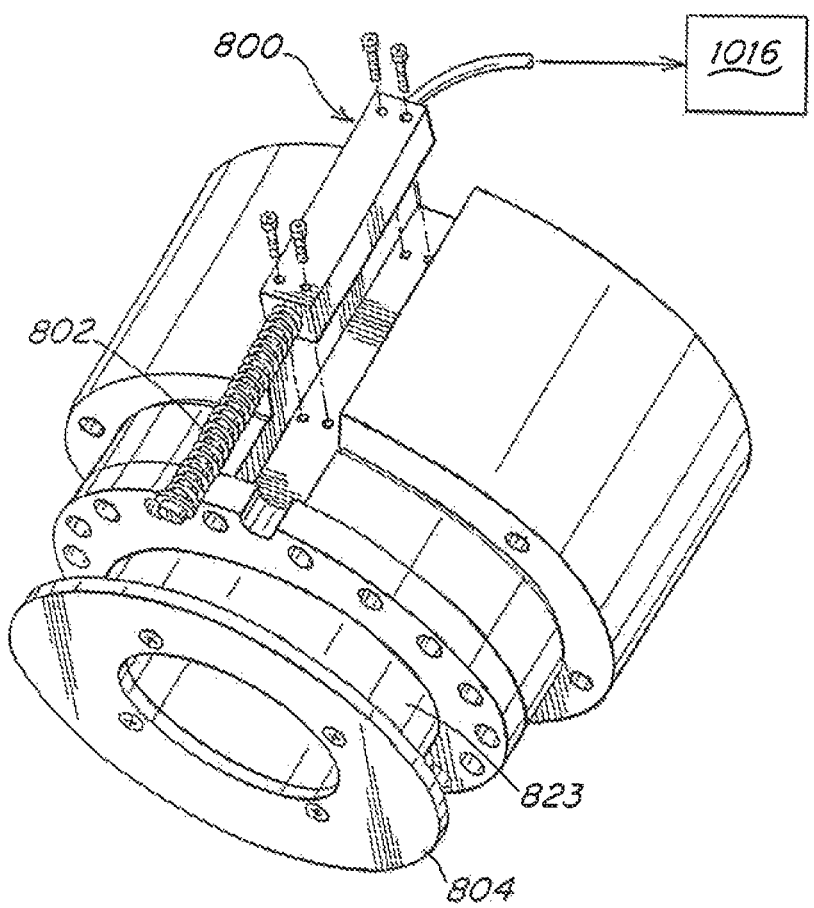
FIGS. 8A, 8B show various embodiments of piston sensors that can be used in a variety of implementations of the invention, the sensors shown in these figures being mounted so as to measure the position of the piston component of the actuator which is indicative of the position of the valve pin relative to the gate.
Figure 8B:
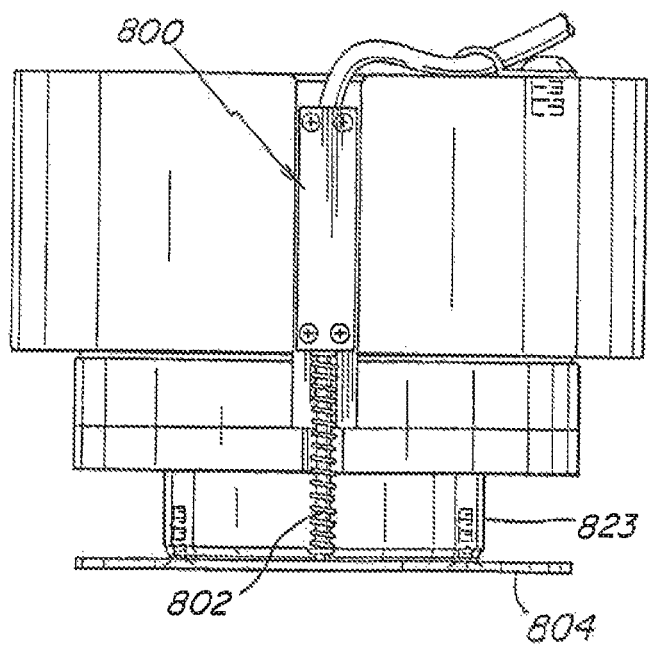
Figure 8C:
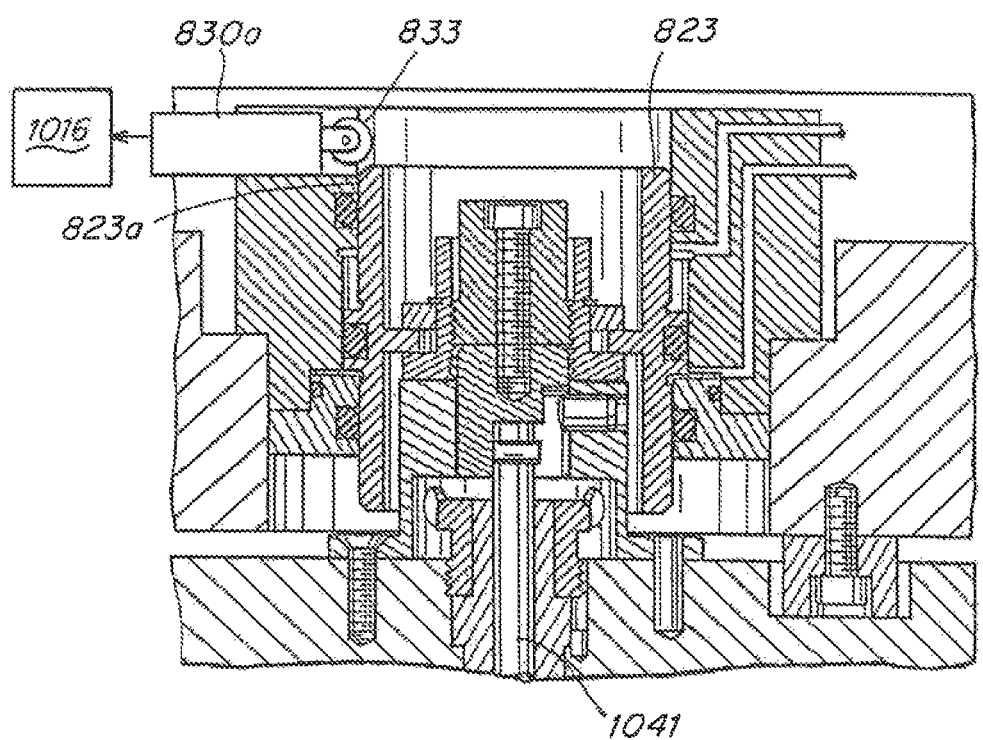
FIGS. 8C, 8D show embodiments using limit switches that detect and signal specific positions of the actuator that can be used to determine velocity, position and switchover to higher openness of valve restrictor and/or upstream velocity of travel of the actuator and valve pin.
Figure 8D:
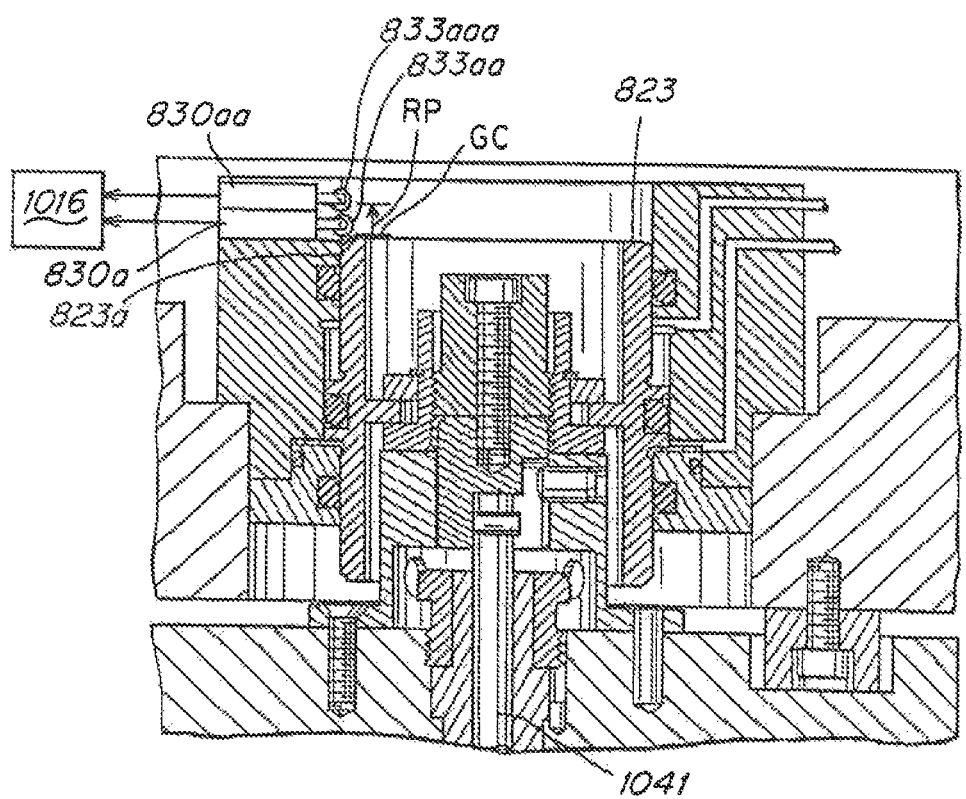
Figure 9A:
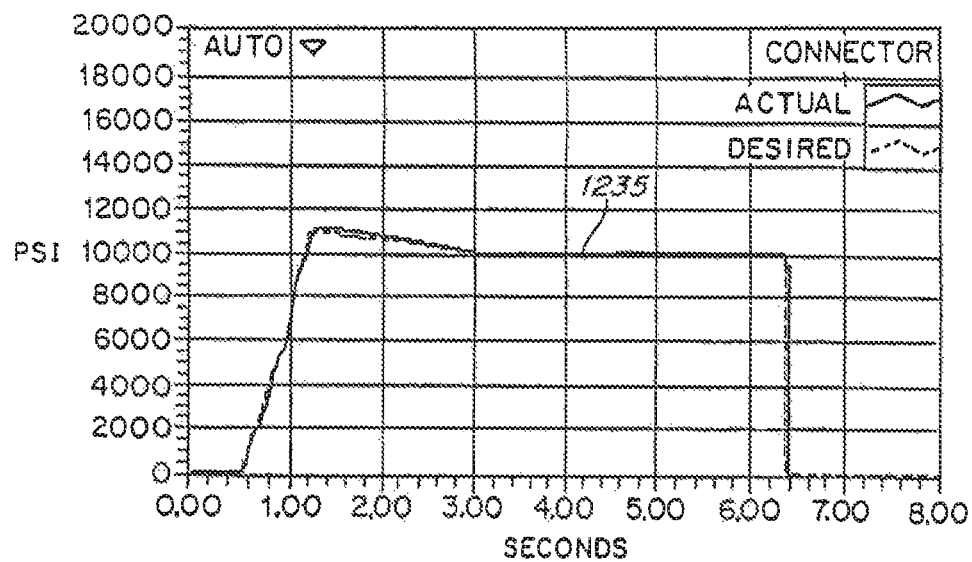
FIGS. 9A-9D are a series of graphs representing actual pressure (versus target pressure) measured in four injection nozzles coupled to a manifold, such as in the apparatus of FIG. 6.
Figure 9B:
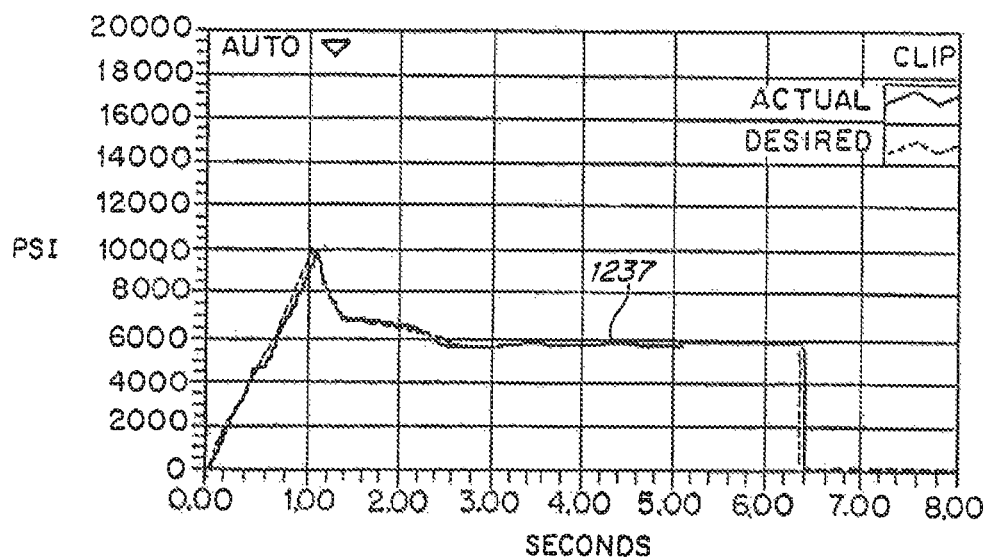
Figure 9C:
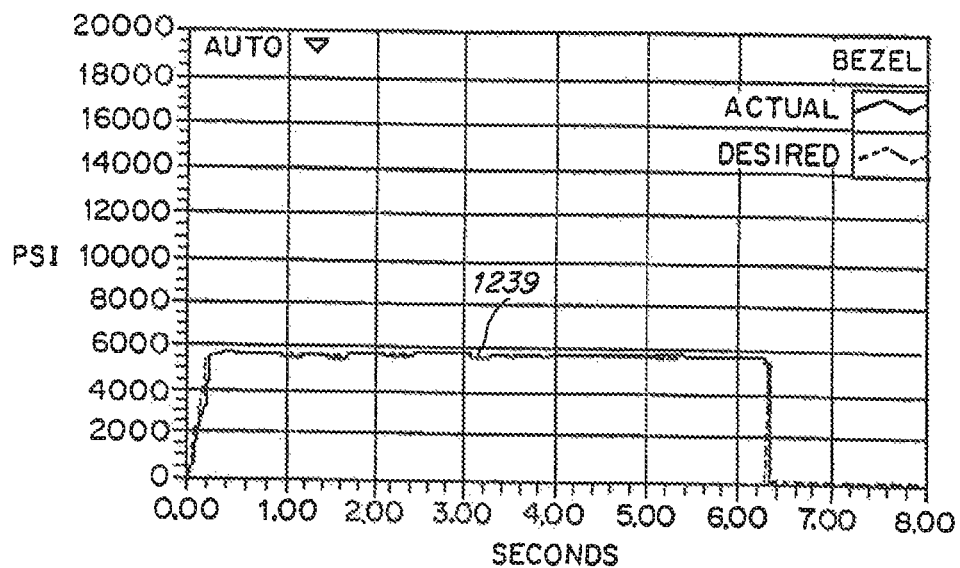
Figure 9D:
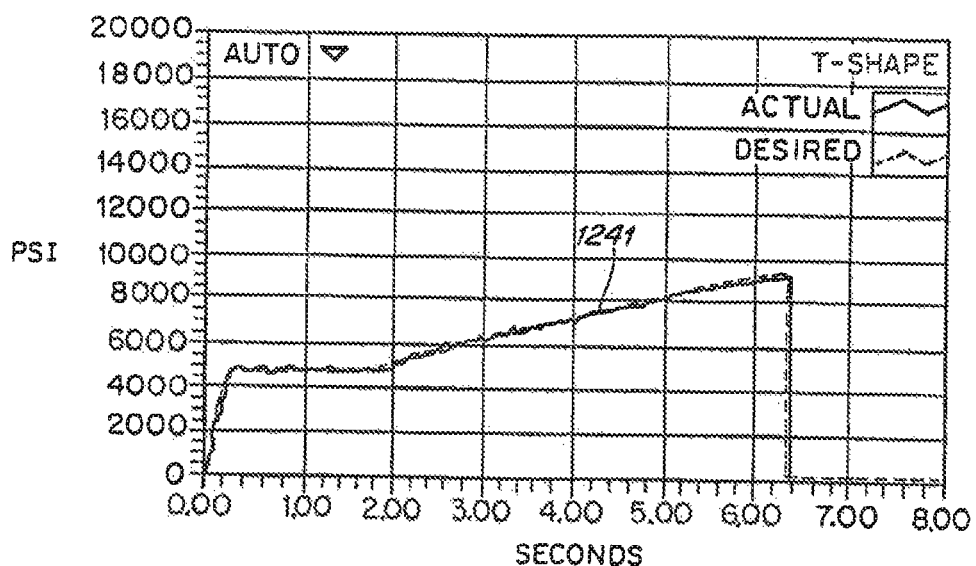

FIGS. 8A-8D show various examples of position sensors, the mounting and operation of which are described in U.S. Patent Publication No. 2009/0061034, the disclosure of which is incorporated herein by reference. As shown the position sensor 800 of FIGS. 8A and 8B for example can track and signal the position of the piston of an actuator piston 823 continuously along its entire path of travel from which data a pin velocity can be continuously calculated over the length of RP via a spring loaded follower 802 that is in constant engagement with flange 804 during the course of travel of piston 823. Mechanism 800 constantly sends signals to controller 1016 in real time to report the position of pin 1041 and its associated actuator. FIGS. 8C, 8D show alternative embodiments using position switches that detect position at specific individual positions of the actuator and its associated valve pin 1041. The FIG. 8C embodiment uses a single trip position switch 830a with trip mechanism 833 that physically engages with the piston surface 823a when the piston 823 reaches the position of the trip mechanism 833. The FIG. 8D embodiment shows the use of two separate position switches 830a, 830aa having sequentially spaced trips 833aa and 833aaa that report the difference in time or distance between each trip engaging surface 823a of the piston, the data from which can be used by controller 1016 to calculate velocity of the actuator based on the time of travel of the actuator from tripping one switch 830a and then tripping the next 830aa. In each embodiment the position switch can signal the controller 1016 when the valve pin 1041, 1042 has travelled to one or more selected intermediate upstream gate open positions between GC (gate closed) and RP so that the velocity of the pin can be adjusted to the selected or predetermined velocities determined by the user. As can be readily imagined other position sensor mechanisms can be used such as optical sensors, sensors that mechanically or electronically detect the movement of the valve pin or actuator or the movement of another component of the apparatus that corresponds to movement of the actuator or valve pin.

In alternative embodiments the controller can include a processor and instructions that receive the pin position information and signals from the position sensor and calculate the real time velocity of the pin from the pin position data in real time at one or more times or positions over the course of the pin travel through the RP path length and/or beyond. Typically such calculations of velocity are continuous throughout the cycle. In such an embodiment, the calculated pin velocity is constantly compared to a predetermined target profile of pin velocities and the velocity of the pin is adjusted in real time by the controller 1016 to conform to the profile. In this embodiment, as in the previous described embodiment, the pin is moved continuously upstream at all times between the gate closed position and all positions upstream of the gate closed position. Such control systems are described in greater detail in for example U.S. Patent Publication No. 2009/0061034, the disclosure of which is incorporated herein by reference.

As discussed above, control over the velocity of pin movement in an embodiment where the pin is driven by a hydraulic or pneumatic actuator is typically accomplished by controlling the degree of openness of the fluid restriction valve 1600, control over velocity and drive rate or position of valve 1600 being the same functions in terms of the instructions, processor design or computer software that carries out instructing and implementing the velocity or drive rate adjustment to the valve pin or actuator. Where the position sensing system senses the position of the pin or other component multiple times throughout the course of the pin or other component movement, and real time velocity can be calculated by the controller 1016, a program or instructions can be alternatively used to receive a velocity data input by the user to the controller 1016 as the variable to be stored and processed instead of a predetermined voltage or current input Where an actuator that comprises an electric motor is used as the drive mechanism for moving the valve pin 1041, 1042 instead of a fluid driven actuator, the controller 1016 can similarly be programmed to receive and process velocity data input as a variable for controlling the velocity or rate of drive of the electric actuator.

User Interface and Target Profiles

FIG. 9 shows time versus pressure graphs (1235, 1237, 1239, 1241) of the pressure detected by four pressure transducers associated with four nozzles mounted in a manifold block. The four nozzles are substantially similar to the nozzles shown in FIG. 6 and include pressure transducers coupled to the controller 1016.

The graphs of FIGS. 9A-9D are generated on a user interface (e.g., 21, 71 of FIG. 1), so that a user can observe the tracking of the actual pressure versus the target pressure during the injection cycle in real time, or after the cycle is complete. The four different graphs of FIG. 9 show four independent target pressure profiles ("desired") emulated by the four individual nozzles. Different target profiles are desirable to uniformly fill different sized individual cavities associated with each nozzle, or to uniformly fill different sized sections of a single cavity. Graphs such as these can be generated with respect to any of the previous embodiments described herein.

The valve pin associated with graph 1235 is opened sequentially at 0.5 seconds after the valves associated with the other three graphs (1237, 1239 and 1241) were opened at 0.00 seconds. At approximately 6.25 seconds, at the end of the injection cycle, all four valve pins are back in the closed position. During injection (for example, 0.00 to 1.0 seconds in FIG. 9B) and pack (for example, 1.0 to 6.25 seconds in FIG. 9B) portions of the graphs, each valve pin is controlled to a plurality of positions to alter the pressure sensed by the pressure transducer associated therewith to track the target pressure.

Figure 10:
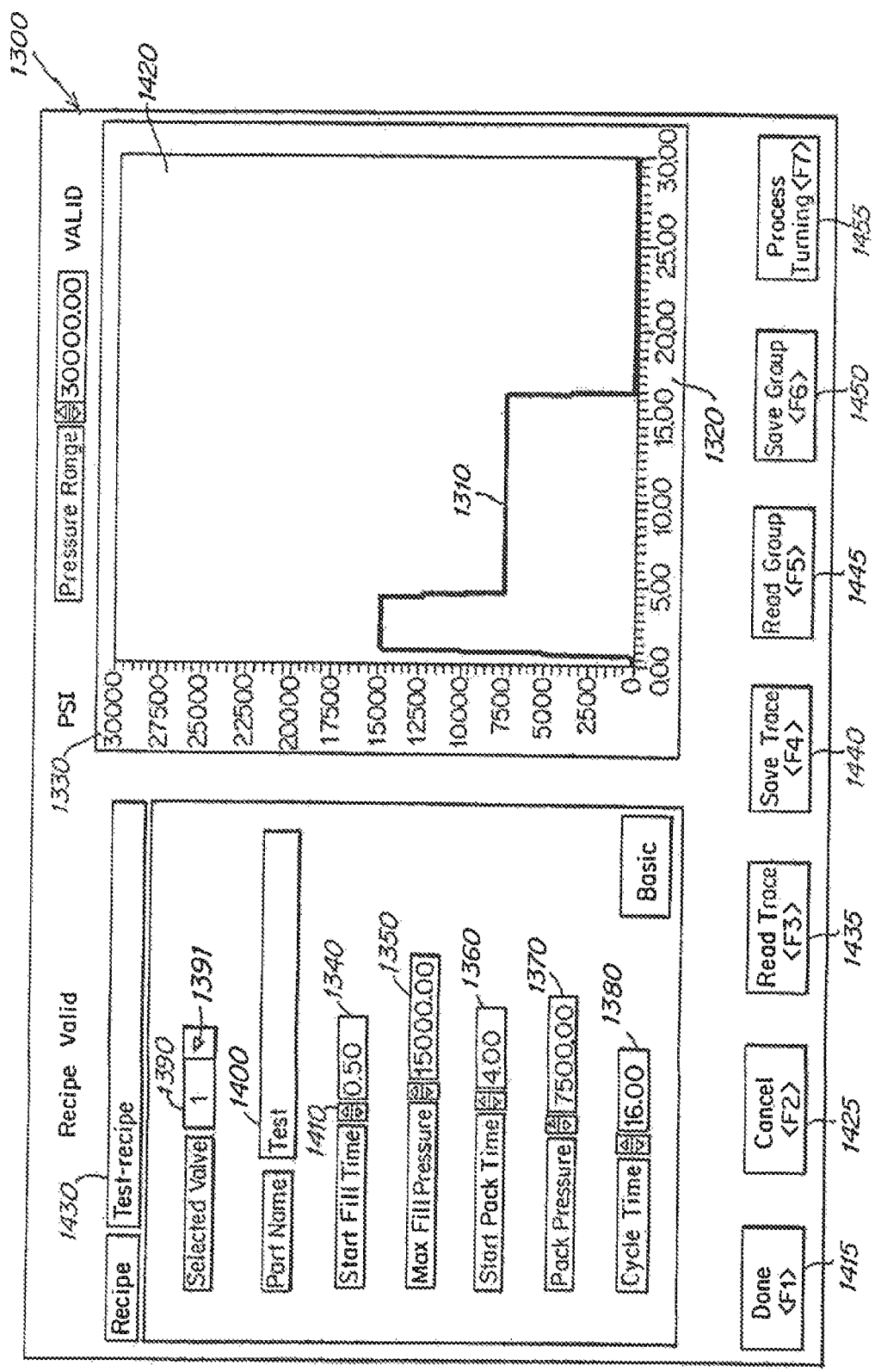
FIG. 10 shows an interactive screen display of a user interface, such as that shown in FIG. 1, which screen is used to display, create, edit and store target profiles.

Through the user interface, target profiles can be designed, and changes can be made to any of the target profiles using standard (e.g., windows-based) editing techniques. The profiles are then used by controller 1016 to control the position of the valve pin. For example, FIG. 10 shows an example of a profile creation and editing screen 1300 generated on a user interface.

Screen 1300 is generated by a windows-based application performed on the user interface, e.g., any of the user interfaces 21 shown in FIG. 1. Alternatively, this screen display could be generated on an interface associated with the controller (e.g., display 71 associated with controller 8 in FIG. 1). Interactive screen 1300 provides a user with the ability to create a new target profile or edit an existing target profile for any given nozzle and cavity associated therewith.

A profile 1310 includes (x, y) data pairs, corresponding to time values 1320 and pressure values 1330 which represent the desired pressure sensed by the pressure transducer for the particular nozzle being profiled. The screen shown in FIG. 10 is shown in a "basic" mode in which a limited group of parameters are entered to generate a profile. For example, in the foregoing embodiment, the "basic" mode permits a user to input start time displayed at 1340, maximum fill pressure displayed at 1350 (also known as injection pressure), the start of pack time displayed at 1360, the pack pressure displayed at 1370, and the total cycle time displayed at 1380.

The screen also allows the user to select the particular valve pin they are controlling displayed at 1390, and name the part being molded displayed at 1400. Each of these parameters can be adjusted independently using standard windows-based editing techniques such as using a cursor to actuate up/down arrows 1410, or by simply typing in values on a keyboard. As these parameters are entered and modified, the profile will be displayed on a graph 1420 according to the parameters selected at that time.

By clicking on a pull-down menu arrow 1391, the user can select different nozzle valves in order to create, view or edit a profile for the selected nozzle valve and cavity associated therewith. Also, a part name 1400 can be entered and displayed for each selected nozzle valve.

The newly edited profile can be saved in computer memory individually, or saved as a group of profiles for a group of nozzles that inject into a particular single or multi-cavity mold. The term "recipe" is used to describe one or more of profiles for a particular mold and the name of the particular recipe is displayed at 1430 on the screen icon.

To create a new profile or edit an existing profile, first the user selects a particular nozzle valve of the group of valves for the particular recipe group being profiled. The valve selection is displayed at 1390. The user inputs an alpha/numeric name to be associated with the profile being created, for family tool molds this may be called a part name displayed at 1400. The user then inputs a time displayed at 1340 to specify when injection starts. A delay can be with particular valve pins to sequence the opening of the valve pins and the injection of melt material into different gates of a mold.

The user then inputs the fill (injection) pressure displayed at 1350. In the basic mode, the ramp from zero pressure to max fill pressure is a fixed time, for example, 0.3 seconds. The user next inputs the start pack time to indicate when the pack phase of the injection cycle starts. The ramp from the filling phase to the packing phase is also fixed time in the basic mode, for example, 0.3 seconds.

The final parameter is the cycle time which is displayed at 1380 in which the user specifies when the pack phase (and the injection cycle) ends. The ramp from the pack phase to zero pressure may be instantaneous when a valve pin is used to close the gate, or slower in a thermal gate due to the residual pressure in the cavity which will decay to zero pressure once the part solidifies in the mold cavity.

User input buttons 1415 through 1455 are used to save and load target profiles. Button 1415 permits the user to close the screen. When this button is clicked, the current group of profiles will take effect for the recipe being profiled. Cancel button 1425 is used to ignore current profile changes and revert back to the original profiles and close the screen. Read Trace button 1435 is used to load an existing and saved target profile from memory. The profiles can be stored in memory contained in one or more of the operator interface 21, the main MCU 9, and the recipe storage MCU 16. Save trace button 1440 is used to save the current profile. Read group button 1445 is used to load an existing recipe group. Save group button 1450 is used to save the current group of target profiles for a group of nozzle valve pins. The process tuning button 1455 allows the user to change the settings (for example, the gains) for a particular nozzle valve in a control zone. Also displayed is a pressure range 1465 for the injection molding application.

While specific embodiments of the present invention have been shown and described, it will be apparent that many modifications can be made thereto without departing from the scope of the invention. For example, in one embodiment the controller is mounted on a hydraulic power unit. In one embodiment, the flow control MCU receives, displays and/or records a signal from an electronic mold counting sensor for correlating detected pin motion data to the recipe data for a given molding cycle. In one embodiment, the system includes a plurality of flow control MCU's each controlling a corresponding one of a plurality of pins. In one embodiment, the flow control MCU transmits signals to an electric motor for controlling one or more of pin position and rate of pin movement. In one embodiment, both the recipe MCU and the flow control MCU are mounted to the mold. In one embodiment, the controller is contained in a physical box which is mounted to the injection machine and/or placed near the injection machine. In one embodiment, the controller associates (compares) the recipe data to data collected during one injection cycle. In one embodiment, each valve pin has its own profile per injection cycle, and the recipe is a collection of such profiles for a plurality of pins.

In one embodiment, a mold having no recipe or a non-approved (not current or previously tested) recipe stored in the recipe storage MCU, is mounted to the machine. An operator can then create a recipe by testing different inputs to the controller, e.g., adjusting the rate of speed and/or position of one or more pins. When the user is satisfied with the parts being produced in the mold or with data and/or signals received from the mold (e.g., temperature and/or pressure), the operator then stores a copy of the newly created recipe by transmitting (direct or indirectly) the new recipe for storage on the recipe storage MCU. The main MCU of the controller stores a local copy of the new recipe, and runs the recipe (executes instructions implementing the recipe) for the mold. Then later, if this first mold is removed and a new mold is mounted to the machine, where the new mold has a proper recipe already stored on the new mold MCU, the controller can then immediately run the new recipe for the new mold on the machine. If not, the operator can again create a new recipe for the new mold, as previously described.

The recipe data typically comprises a profile of values of a condition of the injected polymer material or a condition or position of a selected component of the injection molding apparatus that is specified to occur at each point in time over the course or duration of an injection cycle when a part is produced in the mold cavity. Thus a profile defines a set of conditions, events or positions to which the injection material or the component of the apparatus is adjusted to attain over the course of a particular injection cycle. Typical injection material conditions that can be specified and controlled are pressure of the injection material at selected positions within a flow channel of the manifold, within an injection nozzle or within the mold cavity. Typical conditions or positions of components of the apparatus that can be controlled and comprise a profile are the position of the valve pin, the position of the screw of the barrel of the injection molding machine and position of an actuator piston. Such profiles and recipes are disclosed in detail in for example U.S. Pat. Nos. 6,464,909 and 8,016,581 and 7,597,828, the disclosures of which are incorporated by reference as if fully set forth herein.

Various other embodiments will be apparent to the skilled person. Accordingly, the invention is not limited by the foregoing embodiments.

What is claimed is:

1. A method of performing an injection molding cycle in an injection molding apparatus comprising a manifold (1039) that receives an injection fluid (1018), the manifold distributing injection fluid to a fluid delivery channel of a nozzle (1020, 1022, 1024) wherein the fluid delivery channel delivers the injection fluid under an injection pressure to a gate (1032, 1034, 1036) of a mold cavity (1030) and a valve pin (1040, 1041, 1042), having an axis and a tip end, being slidably mounted for movement along the axis within the fluid delivery channel, the method comprising:

drivably interconnecting the valve pin to an actuator (1940, 1941, 1942) in an arrangement wherein the actuator drives the valve pin upstream and downstream along the axis and drives the tip end of the valve pin upstream and downstream between a first closed position (GC) where the tip end of the valve pin closes the gate to prevent the injection fluid from flowing into the cavity, a full open position (FO) where the injection fluid material flows freely without restriction from the tip end of the pin through the gate, and an intermediate position (RP) between the first position and the full open position wherein the tip end of the valve pin restricts flow of the injection fluid through the gate along at least a portion of the length of the drive path extending between the first closed position and the intermediate position, and, using a feedback loop (51) of a sensed position (53) of the valve pin or a sensed pressure (54, 55) of the injection fluid to dynamically control movement of the actuator according to a target profile that instructs the actuator to move at a reduced velocity relative to a maximum velocity through one or more intermediate positions or to hold the valve pin in a selected intermediate position for a selected period of time during the course of an injection cycle, and controllably operating the actuator to drive the valve pin upstream beginning from the first closed position to the selected intermediate position, holding the valve pin in the selected intermediate position for the selected period of time, and subsequently driving the valve pin upstream from the intermediate position to the full open position, and controllably operating the actuator to drive the valve pin upstream beginning from the first closed position at a reduced rate of upstream travel, subsequently holding the valve pin in the selected intermediate position and subsequently driving the valve pin upstream from the intermediate position to the full open position at a high rate of upstream travel greater than the reduced rate of upstream travel.

2. The method of claim 1 further comprising controllably operating the actuator to drive the valve pin downstream beginning from the full open position to the selected intermediate position, holding the valve pin in the selected intermediate position for the selected period of time, and subsequently driving the valve pin downstream from the intermediate position to the first closed position.

3. The method of claim 2 further comprising controllably operating the actuator to drive the valve pin downstream beginning from the full open position at a high rate of downstream travel, subsequently driving the valve pin downstream at one or more of intermediate rates of downstream travel, subsequently holding the valve pin in the selected intermediate position and subsequently driving the valve pin downstream from the intermediate position to the first closed position.

4. The method of claim 1 wherein the actuator comprises an electrically powered motor or electric motor.

5. The method of claim 1 wherein the step of using a feedback loop comprises using a sensed pressure of the injection fluid in the mold cavity.

6. The method of claim 1 further comprising controllably operating the actuator to drive the valve pin upstream beginning from the first closed position at a reduced velocity relative to a maximum velocity.

7. An injection molding apparatus comprising a manifold (1039) that receives an injection fluid (1018) from an injection molding machine, the manifold distributing the injection fluid to a fluid delivery channel of a nozzle (1020, 1022, 1024) wherein the fluid delivery channel delivers the injection fluid under an injection pressure to a gate (1032, 1034, 1036) of a mold cavity (1030) and a valve pin (1040, 1041, 1042), having an axis and a tip end, being slidably mounted for movement along the axis within the fluid delivery channel, wherein the valve pin is interconnected to an actuator (1940, 1941, 1942) in an arrangement wherein the actuator is adapted to drive the valve pin upstream and downstream along the axis and to drive the tip end of the valve pin upstream and downstream between a first closed position (GC) where the tip end of the valve pin closes the gate to prevent the injection fluid from flowing into the cavity, a full open position (FO) where the injection fluid material flows freely without restriction from the tip end of the pin through the gate, and an intermediate position (RP) between the first position and the full open position wherein the tip end of the valve pin restricts flow of the injection fluid through the gate along at least a portion of the length of the drive path extending between the first closed position and the intermediate position, the apparatus including a controller (1016) that contains instructions that receive a feedback loop (51) of a sensed position (53) of the valve pin or a sensed pressure (54, 55) of the injection fluid, the instructions using the feedback loop to instruct movement of the actuator to achieve a target profile where the actuator moves at a reduced velocity relative to a maximum velocity or where the valve pin is held in a selected intermediate position for a selected period of time during the course of an injection cycle, wherein the controller includes instructions that instruct the actuator to controllably drive the valve pin upstream beginning from the first closed position to the selected intermediate position, to hold the valve pin in the selected intermediate position for the selected period of time, and to subsequently drive the valve pin upstream from the intermediate position to the full open position, wherein the controller includes instructions that instruct the actuator to drive the valve pin upstream beginning from the first closed position at a reduced rate of upstream travel, to subsequently hold the valve pin in the selected intermediate position and to subsequently drive the valve pin upstream from the intermediate position to the full open position at a high rate of upstream travel greater than the reduced rate of upstream travel.

8. The apparatus of claim 7 wherein the controller includes instructions that instruct the actuator to drive the valve pin downstream beginning from the full open position to the selected intermediate position, to hold the valve pin in the selected intermediate position for the selected period of time, and to subsequently drive the valve pin downstream from the intermediate position to the first closed position.

9. The apparatus of claim 8 wherein the controller includes instructions that instruct the actuator to drive the valve pin downstream beginning from the full open position at a high rate of downstream travel, to subsequently drive the valve pin downstream at one or more of intermediate rates of downstream travel, to subsequently hold the valve pin in the selected intermediate position and to subsequently drive the valve pin downstream from the intermediate position to the first closed position.

10. The apparatus of claim 7 wherein the controller includes instructions that instruct the actuator to drive the valve pin upstream beginning from the fully closed position at a reduced velocity relative to a maximum velocity.

11. The apparatus of claim 7 wherein the actuator comprises an electrically powered motor or electric motor.

12. The apparatus of claim 7 wherein the sensed pressure of the injection fluid is a sensed pressure within the manifold cavity.

* * * * *